United States Patent [19]
Mackinnon et al.

[11] Patent Number: 6,148,115
[45] Date of Patent: Nov. 14, 2000

[54] IMAGE PROCESSING APPARATUS AND IMAGE PROCESSING METHOD

[75] Inventors: Andrew Mackinnon, Tokyo; Masami Ogata, Kanagawa, both of Japan

[73] Assignee: Sony Corporation, Tokyo, Japan

[21] Appl. No.: 08/965,207

[22] Filed: Nov. 6, 1997

[30]   Foreign Application Priority Data

Nov. 8, 1996 [JP] Japan ................................. 8-312815

[51] Int. Cl.⁷ ..................................................... G06K 9/40
[52] U.S. Cl. ........................... 382/266; 382/264; 382/270
[58] Field of Search ................... 382/260, 264, 382/266, 254, 269, 270; 358/447, 448, 465, 466

[56]   References Cited

U.S. PATENT DOCUMENTS

| | | | |
|---|---|---|---|
| 5,218,649 | 6/1993 | Kundu et al. | 382/269 |
| 5,367,385 | 11/1994 | Yuan | 358/465 |
| 5,537,408 | 7/1996 | Branstadt et al. | |
| 5,878,172 | 3/1999 | Go | 382/266 |

FOREIGN PATENT DOCUMENTS 0 727 909  8/1996  European Pat. Off. .

OTHER PUBLICATIONS

Bloks, R.H.J.: "The IEEE–1394 High Speed Serial Bus", Philips Journal of Research, NL, Elsevier, Amsterdam, vol. 50, No. 1/02, pp. 209–216, XP000627671.

*Primary Examiner*—Thomas D. Lee
*Attorney, Agent, or Firm*—Frommer Lawrence & Haug, LLP.; William S. Frommer; Glenn F. Savit

[57]   ABSTRACT

An image processing apparatus and image processing method for performing a smoothing process to a decoded image signal. Edge information of a pixel is detected in response to a spatial change in the pixel value of the image signal and the smoothing process is performed to the image signal based on the edge information. The present invention reduces noise generated in the plain area in a picture without degrading an edge in the picture.

5 Claims, 24 Drawing Sheets

| -1 | -1 | -1 |
|----|----|----|
| 0  | 0  | 0  |
| 1  | 1  | 1  |

| -1 | 0 | 1 |
|----|---|---|
| -1 | 0 | 0 |
| -1 | 0 | 1 |

IMAGE PROCESSING APPARATUS AND IMAGE PROCESSING METHOD

BACKGROUND OF THE INVENTION

1. Field of the Invention

The present invention relates to an image processing apparatus and an image processing method and, more particularly, to an image processing apparatus and method for reducing noise in a decoded image without degrading the edge in a picture.

2. Description of the Related Art

In a quantization process performed to compress digital data, the process represented by the following equation is typically performed to input data.

$$c' = \text{int}(c/Q + 0.5) \tag{1}$$

where Q is a subrange or step size for quantization and the symbol int ( ) represents a function that performs a truncation process. In a inverse quantization process for restoring the data, the process expressed by equation (2) is performed.

$$C'' = C' \times Q \tag{2}$$

This process is a linear quantization (linear inverse quantization), and the value of the decoded data n×Q (n is an integer) is a middle value over the range of a quantization step as shown in FIG. 10, and represents all input data within the subrange or step defined by the following equation.

$$n \times Q - Q/2 \leq c < n \times Q + Q/2 \tag{3}$$

Non-linear quantization techniques have been proposed in which a smaller quantization step is applied in a higher frequency distribution region as shown in FIG. 12 to reduce a quantizing error in connection with data having a large bias in its distribution as shown in FIG. 11.

FIG. 13 is a block diagram of a conventional moving image coding apparatus. In the moving image coding apparatus 1, a frame memory 12 receives and then stores moving image data to be coded.

A motion vector detector 11 detects a motion vector from the input image stored in the frame memory 12. Available as a motion vector detection method is a block matching in which non-superimposing small segments, each being 16×16 pixels (hereinafter referred to as macro block) are subjected to block matching. To achieve a higher accuracy, matching is occasionally performed on a per half-pixel basis.

A motion compensator 20 contains a frame memory 21 and predicts the pixel value at each location in an image to be currently coded based on an image that is coded or locally decoded. The predicted value I'[i,j,t] of a pixel value I[i, j, t] at a location (i,j) in the image that is input at time t is expressed using a motion vector (=(vx(i,j,t)), vy(i,j,t))) corresponding to the location as follows:

$$I'[i, j, t] = (I[i', j', t - T] + \tag{4}$$
$$I[i' + 1, j', t - T] +$$
$$I[i', j' + 1, t - T] +$$
$$I[i' + 1, j' + 1, t - T])/4$$

where i' and j' are expressed as follows.

$$i' = \text{int}(i + vx(i,j,t) \times T)$$

$$j' = \text{int}(i + vy(i,j,t) \times T)$$

where T is a time difference between the time an image I currently being predicted is input and the time the image in the frame memory is input, and I[i',j',t-T], I[i'+1,j',t-T], I[i',j'+1,t-T], I[i'+1,j'+1,t-T] represent pixel values in the frame memory 21 and int(x) represents the maximum integer not in excess of x.

A differential image generator 13 computes a differential between the value of a pixel to be currently coded and its predicted value by the motion compensator 20, and computes the sum s of the absolute values of the differentials on a per macro block basis as follows:

$$S = \sum_{(i,j) \in MB_{pq}} |I[i, j, t] - I'[i, j, t]| \tag{5}$$

where MBpq denotes a macro block designated by pq. When the sum given equation (5) is smaller than a predetermined threshold T1, the differential value corresponding to each macro block is output. When the sum given by equation (5) is greater than the threshold T1, the value of the pixel to be currently coded, rather than the differential value, is output. A macro block output by the differential image generator 13 and having a pixel value is referred to as an intra-macro block while macro blocks other than the intra-macro block are referred to as an inter-macro block. The inter-macro block has thus a differential value.

A flag f indicating whether a macro block is an intra-macro block is sent from the differential image generator 13 to a variable length coder/multiplexer 16 and is multiplexed into a bit stream there. The bit stream is then sent to an image adder 19.

A discrete cosine transform (DCT) unit 14 subjects a block of 8×8 pixels to a two-dimensional DCT. A quantizer (Q) 15 performs a quantization process to a DCT coefficient c provided by the DCT unit 14 using an appropriate quantization step size Q as expressed by the following equation.

$$c' = \text{int}(c/Q) \tag{6}$$

The quantized DCT coefficient c' is fed to the variable length coder/multiplexer 16 and an inverse quantizer ($Q^{-1}$) 17.

The inverse quantizer 17 performs the following inverse quantization process according to a step size equal to the one used by the quantizer 15.

$$c'' = c' \times Q \tag{7}$$

An IDCT unit 18 performs inverse DCT process to a pixel block of 8×8 pixels of the inverse quantized data.

In response to the flag f supplied by the differential image generator 13, the image adder 19 restores the pixel value from the data output by the IDCT unit 18 and the predicted value provided by the motion compensator 20. When the flag f indicates an intra-macro block, the image adder 19 does nothing particular because the data from the IDCT unit 18 is the pixel value. In contrast, when the flag f indicates an inter-macro block, the image adder 19 adds the predicted value output by the motion compensator 20 to the data from the IDCT unit 18 to restore the pixel value. The restored pixel value is sent to the motion compensator 20 to be stored in the frame memory 21 therewithin.

The variable length coder/multiplexer 16 performs a variable length process to and multiplexes the quantized DCT coefficient output by the quantizer 15, the motion vector v output by the motion vector detector 11 and the flag f output by the differential image generator 13, into a bit stream. The bit stream is then transmitted via a predetermined transmission path or is recorded onto a recording medium.

FIG. 14 is a block diagram of a moving image decoding apparatus which receives and decodes the bit stream from the moving image coding apparatus 1 shown in FIG. 13. In the moving image decoding apparatus 31, a demultiplexer/variable length decoder 41 performs the inverse process of the process performed by the variable length coder/multiplexer 16 in the moving image coding apparatus 1 to restore from the bit stream the quantized DCT coefficient, the motion vector v and the flag f. The resulting DCT coefficient is fed to an inverse quantizer 42, the motion vector v is fed to a motion compensator 45, and the flag f is fed to an image adder 44.

The inverse quantizer 42 and an IDCT unit 43 are equivalent to the inverse quantizer 17 and the IDCT unit 18, respectively, and perform the inverse quantization process expressed by equation (7) and the IDCT process, respectively.

The image adder 44 is equivalent to the image adder 19 in the moving image coding apparatus 1. When the flag f sent from the demultiplexer/variable length decoder 41 indicates an intra-macro block, the image adder 19 simply outputs the data from the IDCT unit 43 as its output. When the flag f indicates an inter-macro block, the image adder 44 adds the predicted value output by the motion compensator 45 to the data from the IDCT unit 43 and outputs the sum as the pixel value of the restored image. These pixel values are stored in a frame memory 46 in the motion compensator 45 to generate a predicted image.

The motion compensator 45 is equivalent to the motion compensator 20 in the moving image coding apparatus 1, and predicts the pixel value of each pixel of an image to be currently decoded, using the motion vector v output by the demultiplexer/variable length decoder 41 and the image stored in the frame memory 46.

FIGS. 15 and 16 are respective block diagrams of a moving image coding apparatus and a moving image decoding apparatus respectively employing a wavelet converter and an inverse wavelet converter. The wavelet converter 51, and inverse wavelet converters 52, 61 replace respectively the DCT unit 14 and IDCT units 18, 43 shown in FIGS. 13 and 14. The construction and operation of each of the motion vector detector 11, quantizer 15, inverse quantizers 17, 42, and motion compensators 20, 45 remain unchanged from those shown in FIGS. 13 and 14. Discussed next is thus the difference between these apparatuses in FIGS. 15 and 16 and the moving image coding apparatus and decoding apparatus performing DCT process respectively shown in FIGS. 13 and 14.

In the same manner as in the apparatus shown in FIG. 13, the differential image generator 13 in the moving image coding apparatus performs the determination of intra-macro block. When it determines that the block is an intra-macro block, the average ave of the pixel values within the macro block is computed as follows:

$$ave = \frac{\sum_{(i,j) \in MB_{pq}} I[i,j,t]}{N_{MB_{pq}}} \quad (8)$$

where $N_{MB_{pq}}$ represents the number of pixels (16×16 pixels) within the macro block.

A differential value that is obtained by subtracting the average ave from each pixel value is fed to the wavelet converter 51. The average ave within the intra-macro block is also sent to the variable length coder/multiplexer 16 and the image adder 19 to be used to restore the image.

When the block is an intra-macro block, the image adder 19 adds the average ave of the macro block sent from the differential image generator 13 to inverse wavelet converted data to restore the pixel value.

When the block is an inter-macro block, the differential image generator 13 outputs the differential between the pixel value and the predicted value from the motion compensator 20 and provides its output to the wavelet converter 51 in the same manner as to the DCT unit. The output is then wavelet converted by the wavelet converter 51. The image adder 19 adds the predicted value of the predicted image generated by the motion compensator 20 to the data converted by the inverse wavelet converter 52 to restore the pixel value.

The wavelet converter 51 wavelet converts one frame of data from the differential image generator 13 and outputs the wavelet converted data on a frame-by-frame basis.

The variable length coder/multiplexer 16 performs a variable length process to and multiplexes the quantized wavelet coefficient quantized by the quantizer 15, the motion vector v output by the motion vector detector 11, the flag f and the macro block average ave output by the differential image generator 13, into a bit stream. The bit stream is then transmitted via a predetermined transmission path or is recorded onto a recording medium.

In the moving image decoding apparatus 31 shown in FIG. 16 as well, the inverse wavelet converter 61, image adder 44 and motion compensator 45 perform the decoding process in the same way as already described.

The demultiplexer/variable length decoder 41 performs the inverse process of the process performed by the variable length coder/multiplexer 16 in the moving image coding apparatus 1 to restore from the bit stream the quantized wavelet coefficient, the motion vector v, the flag f and the macro block average ave. The resulting wavelet coefficient is fed to an inverse quantizer 42, the motion vector v is fed to the motion compensator 45, and the flag f and the macro block average ave are fed to an image adder 44.

The inverse quantizer 42 and inverse wavelet converter 61 perform the inverse processes to the quantized wavelet coefficient in the same way as the inverse quantizer 42 and inverse wavelet converter 61 do in the moving image decoding apparatus 31. To predict each pixel value of an image to be currently decoded, the motion compensator 45 performs the same process as the motion compensator 45 does in the moving image decoding apparatus 31.

In the same way as the image adder 44 works in the moving image decoding apparatus 31, this image adder 44 adds the average ave sent from the demultiplexer/variable length decoder 41 to the inverse wavelet converted data in accordance with the flag f when the block is an intra-macro block.

The differential image generator 13 already outputs the differential value between the input pixel value and the predicted value output by the motion compensator 20 in the moving image decoding apparatus 31; thus, when the block is an inter-macro block, the image adder 44 adds the predicted value of the predicted image already generated by the motion compensator 20 to the inverse wavelet converted data to restore the pixel value.

FIG. 17 is a block diagram of the wavelet converter 51. An image data I[i,j] input by the differential image generator 13 is fed to an analyzing horizontal lowpass filter 71 and an analyzing horizontal highpass filter 101 to be subjected to a frequency band split process in a horizontal direction. Available as wavelet analyzing filters are a linear filter having a coefficient, such as the analyzing horizontal lowpass filter 71 shown in FIG. 18A and the analyzing horizontal highpass filter 101 shown in FIG. 18B.

Analyzing filters for wavelet split shown in FIG. 17 and wavelet synthesizing filters for wavelet synthesizing shown in FIG. 19 are constructed to meet the following equations accurately or approximately.

$$H0(-z)F0(z)+H1(-z)F1(z)=0 \quad (9)$$

$$H0(z)F0(z)+H1(z)F1(z)=2z^{-L} \quad (10)$$

where H0(z), H1(z), F0(z) and F1(z) are respectively a transfer function of analyzing lowpass filters 71, 74, 77, 80, 87, and 104, a transfer function of analyzing highpass filters 75, 82, 84, 89, 101, and 106, a transfer function of synthesizing lowpass filters 123, 129, 143, 152, 158, and 162, and a transfer function of synthesizing highpass filters 127, 147, 149, 156, 166 and 168. The letter L represents an arbitrary integer. These constraint conditions guarantee that a synthesized signal accurately or approximately coincides with the input signal prior to band split. FIGS. 20A and 20B list the coefficients of these synthesizing lowpass filters and highpass filters shown as wavelet synthesizing filters in FIG. 19.

The analyzing horizontal lowpass filter 71 in FIG. 17 extracts from the input image data I[i,j] a horizontal low frequency band signal L[i,j] that is a low-frequency component in the horizontal direction, and outputs it to a horizontal sampling unit 72. The horizontal sampling unit 72 performs a decimation process every sample, and outputs the resulting signal L[i',j] to a memory 73.

$$X[i',j]=X[i,j], i'=i/2 \quad (11)$$

where X is L.

The memory 73 is a memory circuit that is constructed of a plurality of line memories to hold data both the analyzing vertical lowpass filter 74 and the analyzing vertical highpass filter 75 require, and is provided with line memories of the number equal to the number of filters used for vertical filtering process. For example, for the filters shown in FIG. 18, nine line memories are used for each of the analyzing vertical lowpass filter 74 and the analyzing vertical highpass filter 75, both being of a multi-tap lowpass filter.

To perform frequency band split process in the vertical direction, the analyzing vertical lowpass filter 74 and analyzing vertical highpass filter 75 perform a vertical lowpass filtering process and a vertical highpass filtering process, respectively, to the data L[i',j] stored in the memory 73. The filters used here may be equivalent to the ones for filtering process in the horizontal direction (namely, the analyzing horizontal lowpass filter 71 and analyzing horizontal highpass filter 101).

Signal LL[i',j] generated by the analyzing vertical lowpass filter 74 and signal LH [i',j] generated by the analyzing vertical highpass filter 75 are respectively fed to vertical subsampling units 76, 91, which perform subsampling process to the image in the vertical direction, namely, a decimation process for decimating one line every two lines according to equation (12).

$$X[i',j']=X[i',j], j'=j/2 \quad (12)$$

where X is LL or LH.

The analyzing horizontal highpass filter 101 separates a horizontal high frequency band signal H[i,j] from the image data I[i,j], and a horizontal subsampling unit 102 performs a decimation process according to equation (11) (X is H), and stores the result in a memory 103.

An analyzing vertical lowpass filter 104 and an analyzing vertical highpass filter 106 perform respectively a lowpass filtering process and a highpass filtering process to the image in the vertical direction in the same way as the analyzing vertical lowpass filter 74 and analyzing vertical highpass filter 75 do.

Signal HL[i',j] generated by the analyzing vertical lowpass filter 104 and signal HH[i',j] generated by the analyzing vertical highpass filter 106 are respectively fed to vertical subsampling units 105, 107, which perform subsampling process to the image in the vertical direction, namely, a decimation process for decimating one line every two lines according to equation (12). The X in equation (12) is HL or HH.

After being subjected to vertical subsampling process through the vertical subsampling units 91, 105, 107, frequency band signals LH[i',j'], HL[i',j'], and HH[i',j'] are output to the quantizer 15 via the wavelet converter 51.

The signal LL[i',j'], which is lowpass filtered in the horizontal direction and vertical direction and output by the vertical subsampling unit 76, is fed to a second-stage analyzing horizontal lowpass filter 77 and an analyzing horizontal highpass filter 84.

The processes, identical to those performed by the analyzing horizontal lowpass filter 71, horizontal subsampling unit 72, memory 73, analyzing vertical lowpass filter 74, analyzing vertical highpass filter 75, and vertical subsampling units 76, 91, are now performed by a analyzing horizontal lowpass filter 77, horizontal subsampling unit 78, memory 79, analyzing vertical lowpass filter 80, analyzing vertical highpass filter 82, and vertical subsampling units 81, 83.

Furthermore, the processes, identical to those performed by the analyzing horizontal lowpass filter 101, horizontal subsampling unit 102, memory 103, analyzing vertical lowpass filter 104, analyzing vertical highpass filter 106, and vertical subsampling units 105, 107, are performed by the analyzing horizontal lowpass filter 84, horizontal subsampling unit 85, memory 86, analyzing vertical lowpass filter 87, analyzing vertical highpass filter 89, and vertical subsampling units 88, 90.

Signals LLLL[i",j"], LHLL[i",j"], HLLL[i",j"], and HHLL[i",j"] thus band split are generated from the signal LL[i',j'].

The output signals of the wavelet converter 51, LLLL[i", j"], LHLL[i",j"], HLLL[i",j"], HHLL[i",j"], and LH[i',j'], HL[i',j'], and HH[i',j'] are wavelet coefficients for respective frequency bands.

In the inverse wavelet converter 52 (identical to the inverse wavelet converter 61) shown in FIG. 19, the frequency band signals provided by the wavelet converter 51 in FIG. 17, namely, the wavelet coefficients LLLL[i",j"], LHLL[i",j"], HLLL[i",j"], HHLL[i",j"], and LH[i',j'], HL[i', j'], and HH[i',j'] are sequentially synthesized to restore the image I[i,j].

More particularly, two-stage band split LLLL[i",j"], LHLL[i",j"], HLLL[i",j"], and HHLL[i",j"] out of the input frequency band signals are first synthesized. These signals are respectively stored in memories 121, 125, 141, 145, each having a plurality of line memories. These memories hold data for the number of lines which are needed by succeeding filters including a synthesizing vertical lowpass filter 123, a synthesizing vertical highpass filter 127, a synthesizing vertical lowpass filter 143, and a synthesizing vertical highpass filter 147.

The number of lines needed is (tap count +1)/2 when the tap count of each vertical filter is an odd number, and is (tap count/2) when the tap count is an even number. For example, when a lowpass filter shown in FIG. 20A is used, two line memories are placed before the synthesizing vertical lowpass filter 123. The number of line memories required by each of the memories 121, 125, 141, 145, 150, 154, 160, and 164 in FIG. 19 is different from the number of line memories required by each of the memories 73, 79, 86 and 103 because a vertical up-sampling process is performed between the memory and the filtering process in FIG. 19.

The vertical up-sampling units 122, 126, 142, and 146 perform a process for inserting one line data having all 0s between any two neighboring lines input according to equation (13).

$$X[i'', j'] = \begin{pmatrix} x[i'', j'']... j' = 2 \times j'' \\ 0 ... j' = 2 \times j'' + 1 \end{pmatrix} \quad (13)$$

where X=LLLL, LHLL, HLLL or HHLL.

The frequency band signals LLLL[i'',j'], LHLL[i'',j'], HLLL[i'',j'], HHLL[i'',j'] that are provided by the vertical up-sampling units 122, 126, 142, and 146, are respectively interpolated in the vertical direction by the synthesizing vertical lowpass filter 123, synthesizing vertical highpass filter 127, synthesizing vertical lowpass filter 143, and synthesizing vertical highpass filter 147, and are then fed to adders 124, 144.

As already described, the synthesizing filters 123, 127, 143, and 147 along with corresponding analyzing filters 80, 82, 87, and 89 have to satisfy the relationships expressed by equations (9) and (10). If the filter having the coefficients listed in FIG. 18 is used as an analyzing filter, the filter having the coefficients shown in FIG. 20 is used as a synthesizing filter.

Interpolated frequency band signals LLLL[i'',j'] and LHLL[i'',j'] are summed by the adder 124 and interpolated frequency band signals HLLL[i'',j'] and HHLL[i'',j'] are summed by the adder 144. The two sums are respectively fed to horizontal up-sampling units 128, 148, where a horizontal up-sampling process is performed according to equation (14).

$$X[i', j'] = \begin{pmatrix} x[i'', j']... i' = 2 \times i'' \\ 0 ... i' = 2 \times i'' + 1 \end{pmatrix} \quad (14)$$

where X=LLL or HLL.

A synthesizing horizontal lowpass filter 129 and a synthesizing horizontal highpass filter 149 perform respectively a horizontal filtering process to the signals that have been horizontal up-sample processed by the horizontal up-sampling units 128, 148 to interpolate them. The two interpolated signals are summed by an adder 140 to restore a low frequency band signal LL[i',j'].

From a memory 150 to a synthesizing horizontal highpass filter 168, the restored signal LL[i', j'] and the frequency band signals LH[i',j'], HL[i',j'], and HH[i',j'] are subjected to the processes which are identical to those performed by the memory 121 through the synthesizing horizontal highpass filter 149, and the image signal I[i,j] is thus reconstructed.

The picture coding method using the above described DCT and motion compensation technique is adopted in international standards such as MPEG (Moving Picture Experts Group) 1, MPEG2 and H. 263, and is widely used.

When coding is performed using the picture coding method utilizing the DCT and motion compensation technique, the image signal is processed on a block-by-block basis, and a great deal of block noise is generated at a lower bit rate. The coded image, if decoded and reproduced as is, is degraded.

When coding is performed using the picture coding method utilizing the wavelet conversion technique, the image signal is processed on a frame-by-frame basis. Although the generation of block noise is precluded, ringing noise unique to the wavelet coding is generated in a plain area in the vicinity of an edge in a picture. The coded image, if decoded and reproduced as is, is degraded.

SUMMARY OF THE INVENTION

Accordingly, it is an object of the present invention to reduce noise without degrading an edge of an image by detecting edge information of a predetermined pixel in response to a spatial change in the pixel value of an image signal and by performing a smoothing process to a pixel selected in accordance with the edge information.

According to a first aspect of the present invention, the image processing apparatus for performing a smoothing process to a decoded image signal which contains a plurality of pixels having pixel values comprises detection means for detecting edge information of a pixel in response to a spatial change in the pixel value of the image signal and smoothing means for performing the smoothing process to the image signal based on the edge information.

According to a second aspect of the present invention, the image processing method for performing a smoothing process to a decoded image signal which contains a plurality of pixels having pixel values, comprises the steps of detecting edge information of a pixel in response to a spatial change in the pixel value of the image signal and performing the smoothing process to the image signal based on the edge information.

BRIEF DESCRIPTION OF THE DRAWINGS

FIGS. 18A and 18B show coefficients of analyzing filters of FIG. 17;

FIGS. 20A and 20B show coefficients of synthesizing filters of FIG. 19;

DESCRIPTION OF THE PREFERRED EMBODIMENTS

Figure 1:
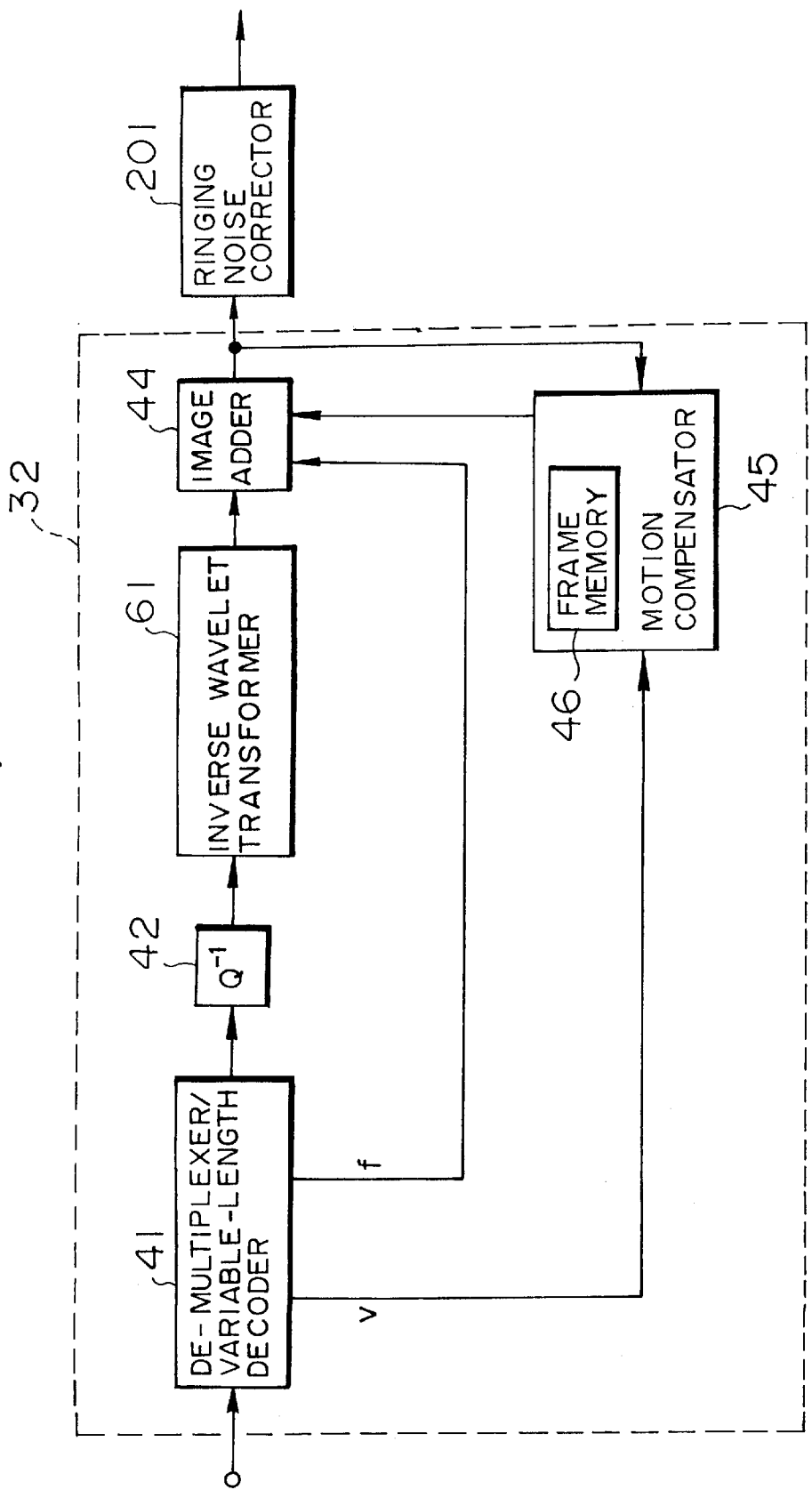
FIG. 1 is a block diagram showing an image decoding apparatus according to a first embodiment of the image processing apparatus of the present invention.

FIG. 1 is a block diagram showing an image decoding apparatus 32 according to a first embodiment of the image processing apparatus of the present invention. The image decoding apparatus 32 decodes an image signal that is coded through a wavelet conversion.

Figure 16:
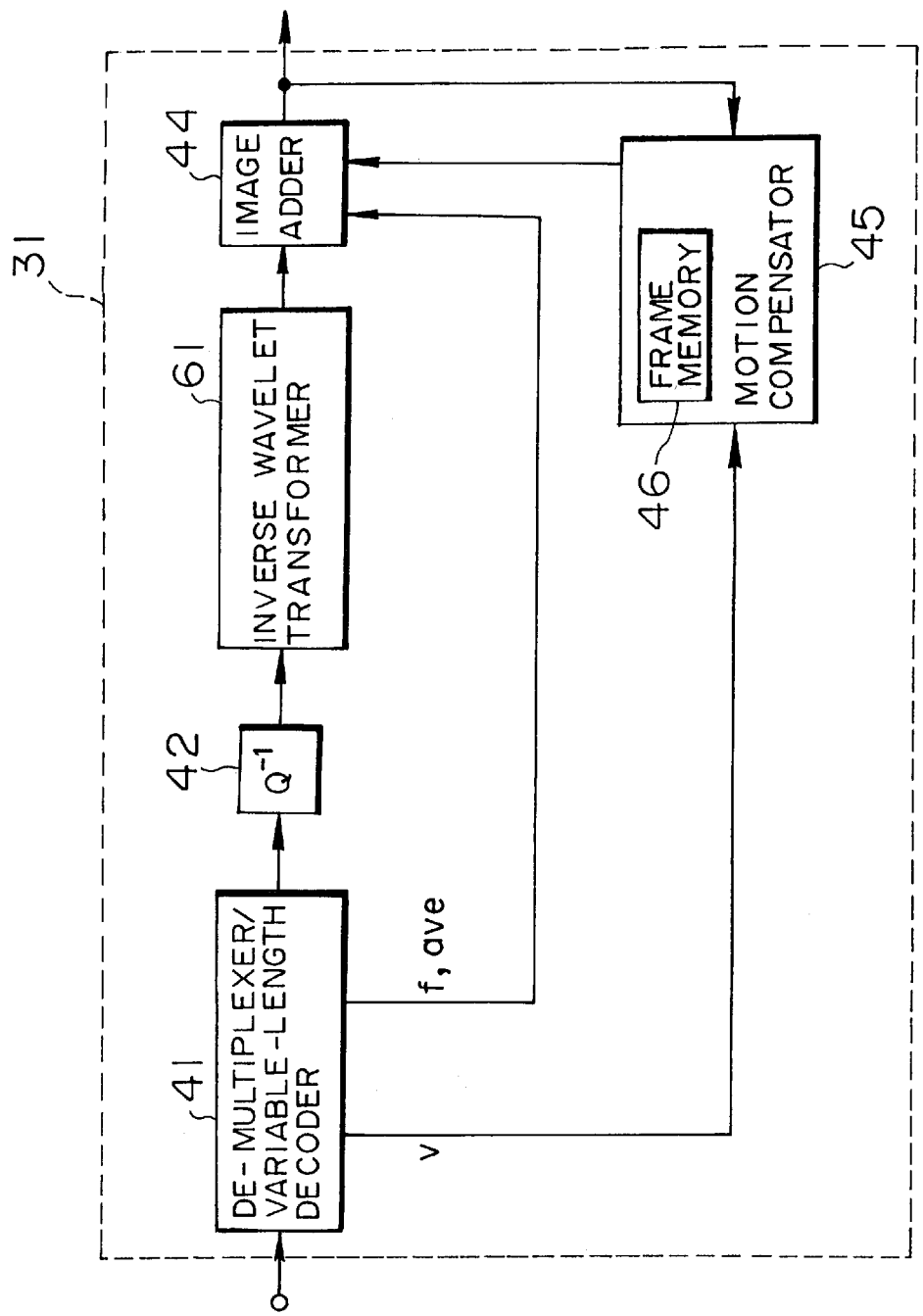
FIG. 16 is a block diagram showing another conventional moving image decoding apparatus.
Figure 17:
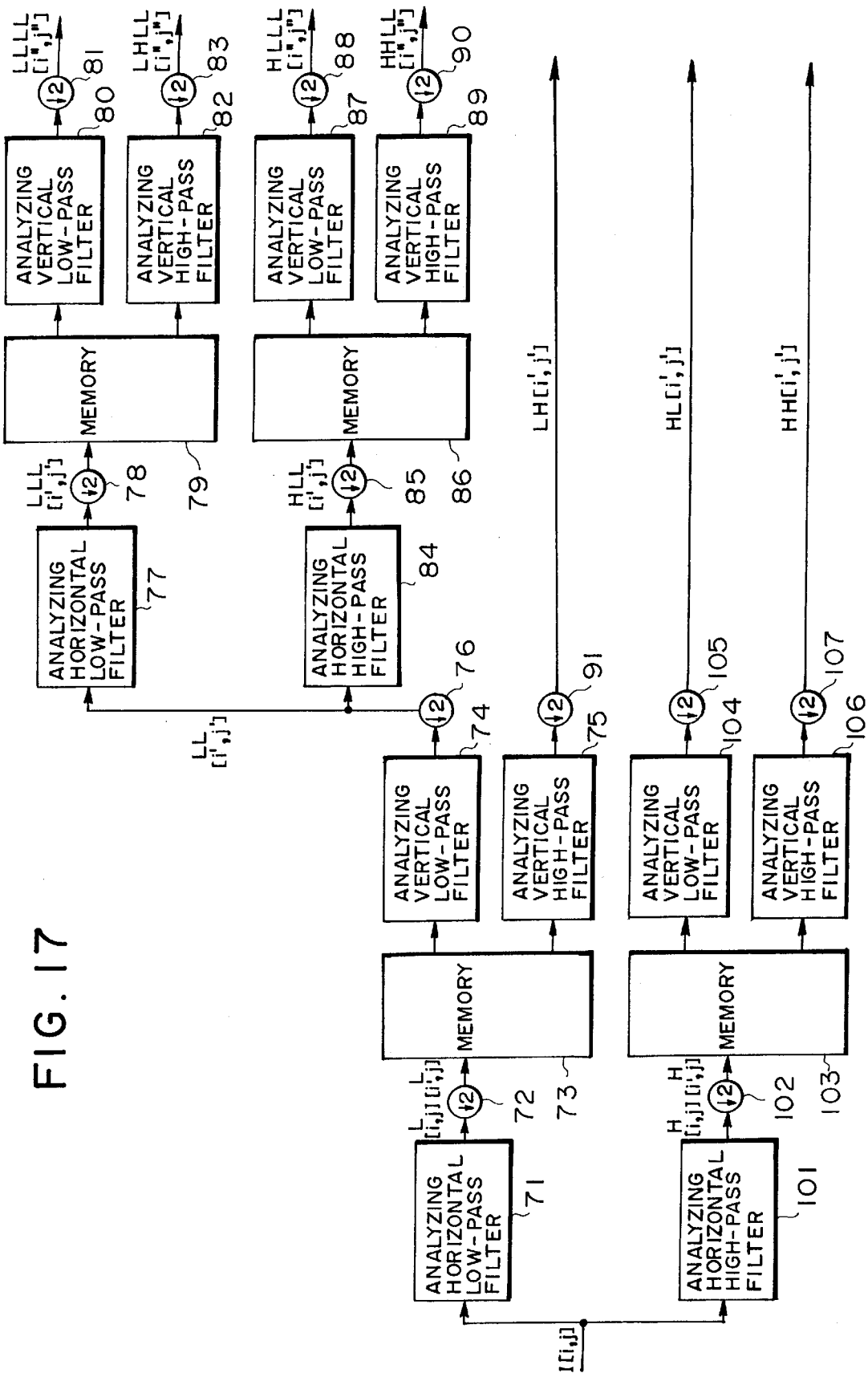
FIG. 17 is a block diagram showing a wavelet converter of FIG. 15.
Figure 19:
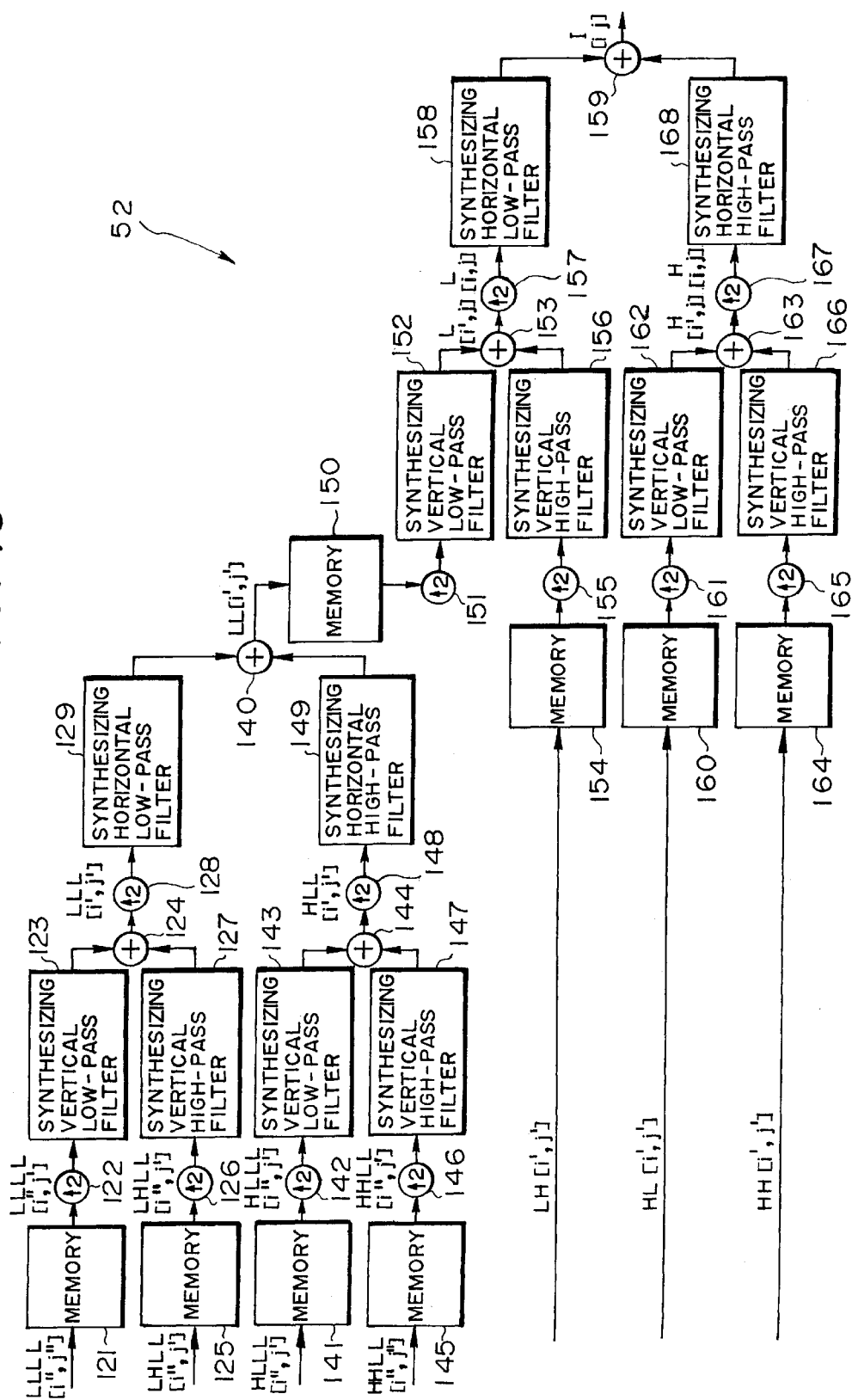
FIG. 19 is a block diagram showing an inverse wavelet converter of FIG. 15.

In the discussion of the construction and operation of the image decoding apparatus 32 of the present invention, components equivalent to those with reference to FIG. 16 are designated with the same reference numerals.

Figure 15:
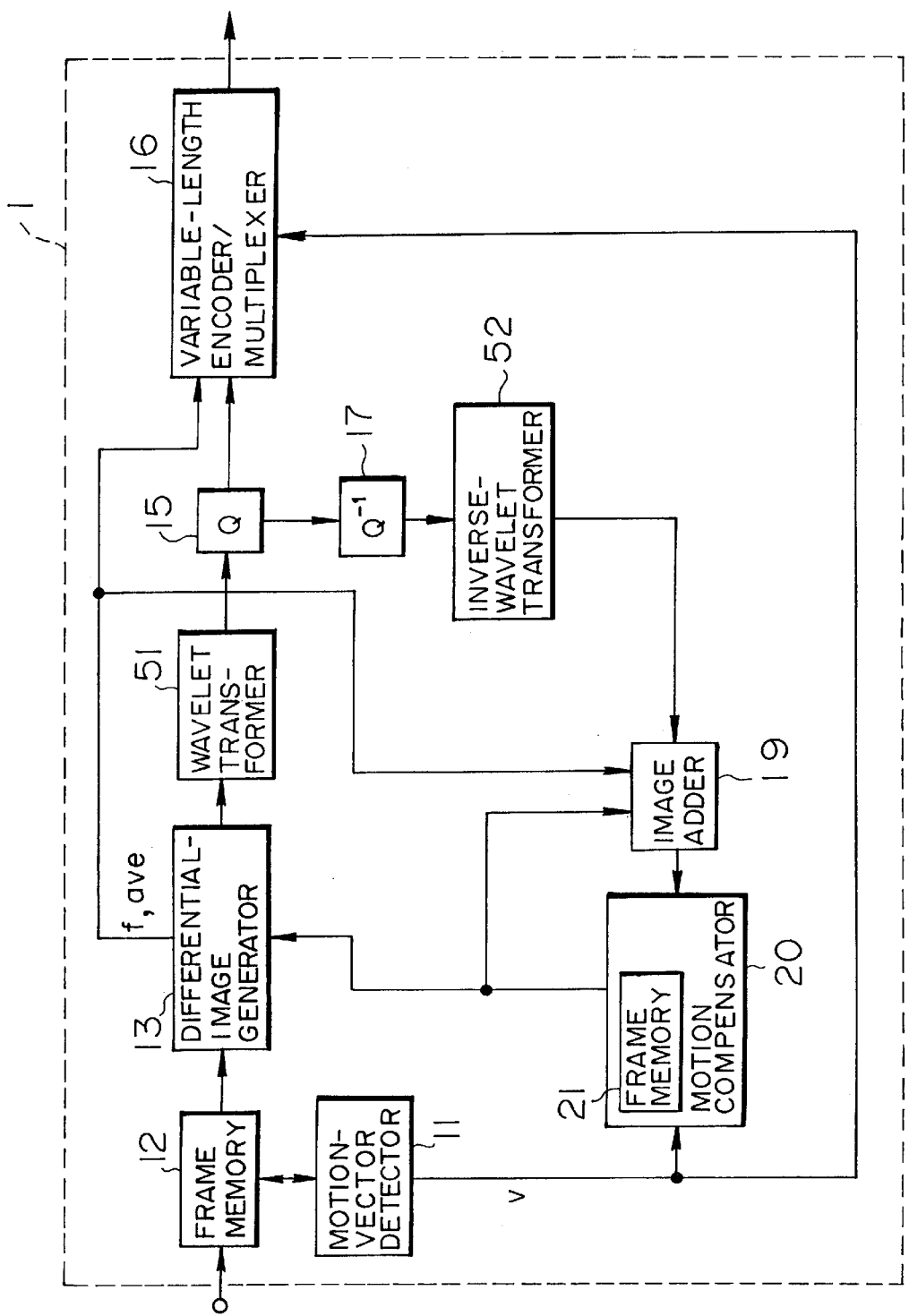
FIG. 15 is a block diagram showing another conventional moving image coding apparatus.

The image decoding apparatus 32 is now discussed. The demultiplexer/variable length decoder 41 restore a wavelet coefficient that is quantized on a frame-by-frame basis, a motion vector v, a flag f and a macro block average ave from the bit stream generated by the moving image coding apparatus shown in FIG. 15. The resulting wavelet coefficient is fed to an inverse quantizer 42 on a frame-by-frame basis, the motion vector v is fed to a motion compensator 45 on a per macro block basis, the flag f and the macro block average ave are fed to an image adder 44 on a per macro block basis.

The inverse quantizer 42 performs an inverse quatization process to the wavelet coefficient that has been quantized on a frame-by-frame basis and outputs a wavelet coefficient on a frame-by-frame basis.

The inverse wavelet converter 61 performs an inverse wavelet conversion process to the wavelet coefficient on a frame-by-frame basis, and feeds the inverse wavelet converted data to the image adder 44 on a per macro block basis. The motion compensator 45 includes a frame memory 46, and predicts the pixel value of an image to be currently decoded, using the already decoded image stored in the frame memory 46 and the motion vector v output by the demultiplexer/variable length decoder 41.

Based on the flag f provided by the demultiplexer/variable length decoder 41, the image adder 44 adds the macro block average ave sent from the demultiplexer/variable length decoder 41 to the inverse wavelet converted data when the block is an intra-macro block. When the block is an inter-macro block, the image adder 44 adds the predicted value of the predicted image already generated by the motion compensator 20 to the inverse wavelet converted data to restore the pixel value. The image thus restored is fed to a ringing noise corrector 201 while it is also fed to the frame memory 46 in the motion compensator 45 to generate a motion predicted image.

The ringing noise corrector 201 performs edge detection process and smoothing process to the image restored by the image adder 44, and finally outputs the processed image.

Figure 2:
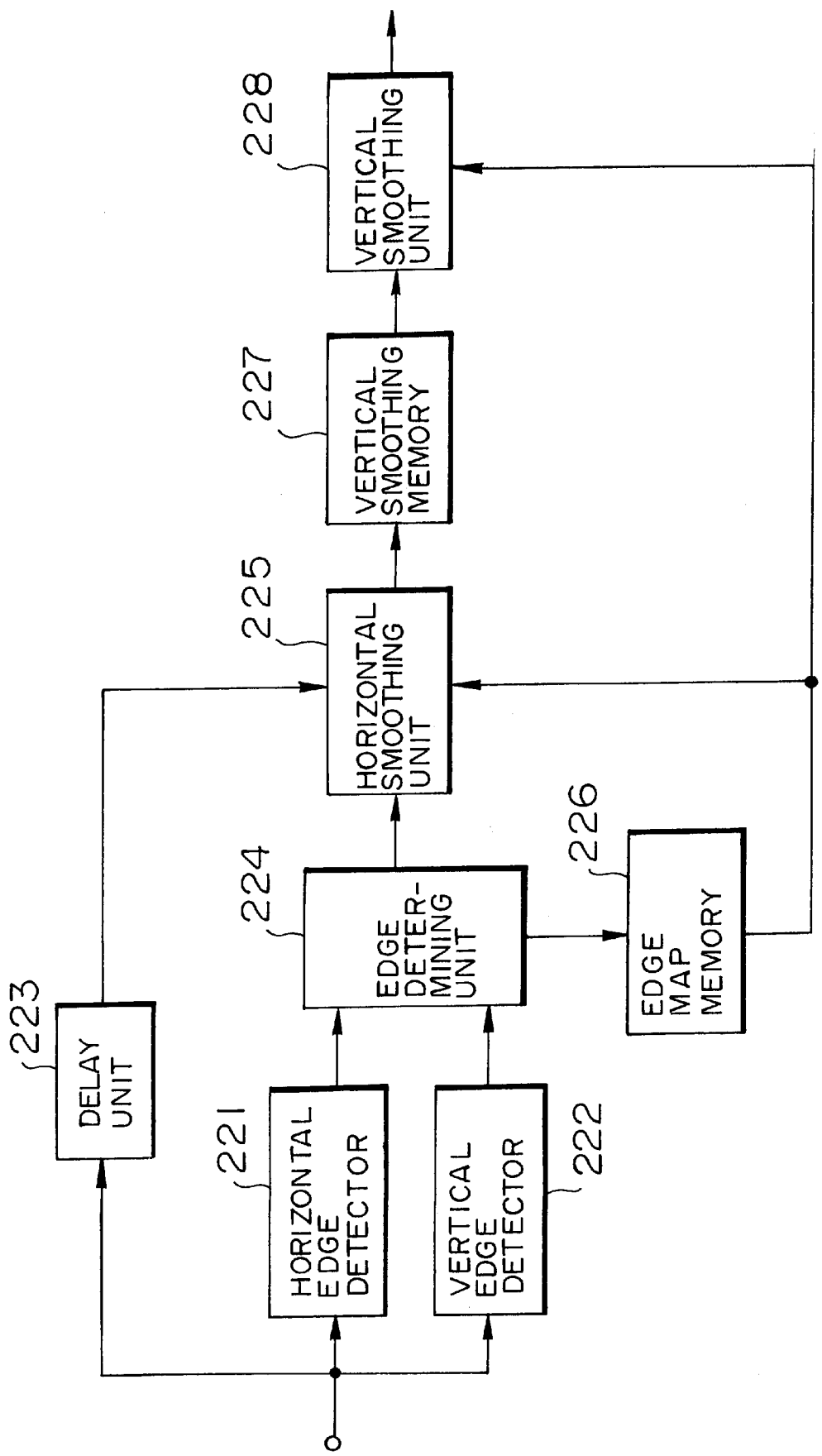
FIG. 2 is a block diagram showing a ringing noise corrector.

FIG. 2 is a block diagram showing the ringing noise corrector 201.

Figures 3A, 3B, 4:
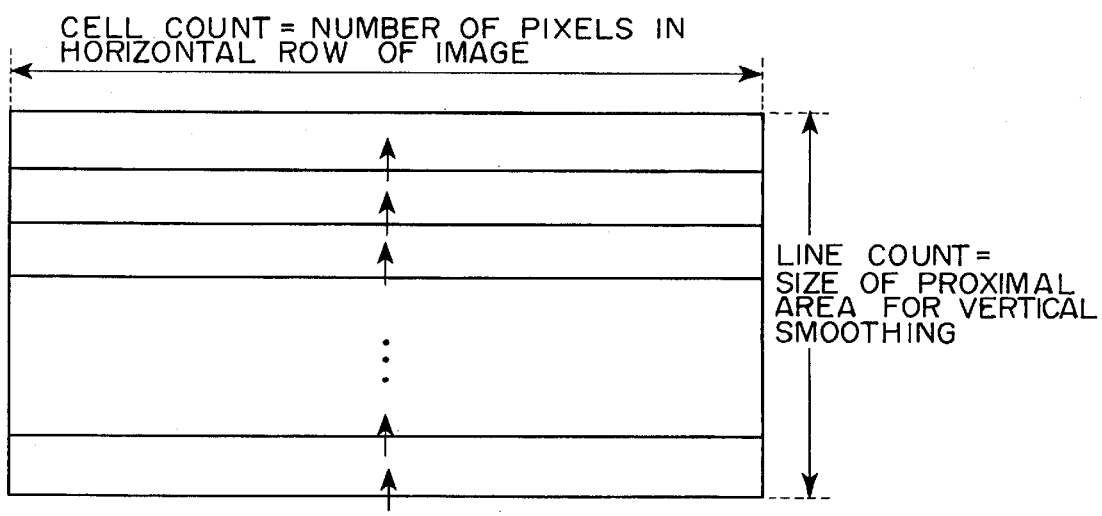
FIGS. 3A and 3B show examples of horizontal edge and vertical edge detection filters.
FIG. 4 shows the memory arrangement of an edge map memory.

A horizontal edge detector 221 performs a convolution computation using a two-dimensional linear differential filter (horizontal edge detection filter) as shown in FIG. 3A, and feeds the absolute value of the output as a horizontal edge signal h to an edge determining unit 224.

A vertical edge detector 222 performs a convolution computation using a two-dimensional linear differential filter (vertical edge detection filter) as shown FIG. 3B, and feeds the absolute value of the output as a vertical edge signal v to the edge determining unit 224.

The edge determining unit 224 performs a thresholding process by applying a predetermined threshold T to the horizontal edge signal h and vertical edge signal v. More particularly, when one of the values of the horizontal edge signal h and the vertical edge signal v is greater than the threshold T, the edge determining unit 224 outputs a value, as edge information, indicative of an edge (for example 1), to store it in an edge map memory 226. When both values of the edge signals, h and v, are equal to or smaller than the threshold T, the edge determining unit 224 outputs a value, as edge information, indicative of a non-edge (for example 0), to store it in the edge map memory 226.

FIG. 4 shows a memory arrangement of the edge map memory 226. As shown, the edge map memory 226 includes a plurality of line memories, the number of which is equal to the number (size) of proximal or neighboring areas (2N+1) that are used by a vertical smoothing unit 228 to be described later.

Each line memory includes cells, the number of which is equal to the number of pixels of the image along its horizontal direction, and stores values of the pixels corresponding to one line. Each cell in each line memory is constructed of a one-bit memory, which stores 1 or 0, indicating whether the corresponding pixel is included in an edge.

The edge map memory 226 shifts the memory content of the lines one by one as shown in FIG. 4 when the horizontal smoothing process of the (2N+1) lines and the vertical smoothing process of the data corresponding to these lines are completed, and stores in its empty line memory the edge information of a next line of the image coming in from the edge determining unit 224.

A delay unit 223 delays input image data (restored image signal) by a duration the edge map memory 226 takes to store the edge information of data, the number of which is equal to the size of neighboring areas (2N+1) used by a horizontal smoothing unit 225.

The horizontal smoothing unit 225 performs the smoothing process to the data streams sequentially provided by the delay unit 223 in accordance with the edge information stored in the edge map memory 226, and outputs the horizontally smoothed data to store them in a vertical smoothing memory 227.

Like the edge map memory 226 shown in FIG. 4, the vertical smoothing memory 227 includes a plurality of line memories, the number of which is equal to the number (size) of neighboring areas (2N+1) that are used by the vertical smoothing unit 228 to be described later.

In the same way as the edge map memory 226, the vertical smoothing memory 227 shifts the data of the lines by one line each time the vertical smoothing process of one line is completed, and stores in its empty line memory the data of a next line of the image coming in from the horizontal smoothing unit 225.

Each cell in the edge map memory 226 is constructed of a one-bit memory while each cell in the vertical smoothing memory 227 is constructed of bits, the number of which is large enough to store pixel data at a sufficiently high accuracy level subsequent to the horizontal smoothing process.

When the vertical smoothing memory 227 stores the lines of data needed for vertical smoothing, the vertical smoothing unit 228, in the same manner as the horizontal smoothing unit 225, performs the smoothing process to the vertically arranged data columns, out of the data stored in the vertical smoothing memory 227, on a column-by-column basis, referencing the edge information stored in the edge map memory 226.

Figure 21:
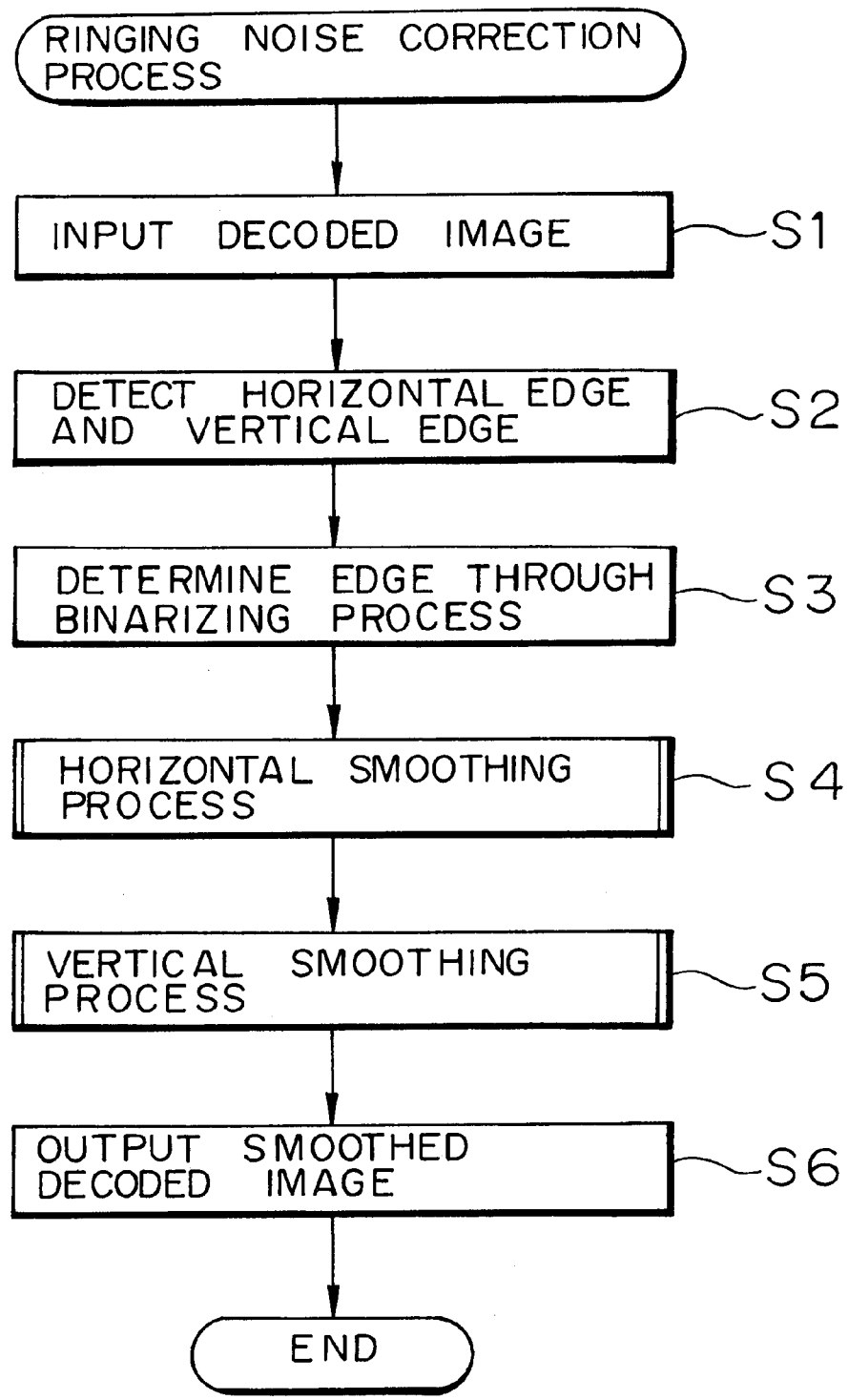
FIG. 21 is a flow diagram showing the process by the ringing noise corrector of the first embodiment.

Referring to a flow diagram shown in FIG. 21, the operation of the ringing noise corrector 201 in the image decoding apparatus shown in FIG. 1 is now discussed.

In step S1, the image signal from the image adder 44 is fed to the horizontal edge detector 221, the vertical edge detector 222 and the delay unit 223.

In step S2, the horizontal edge detector 221 performs a convolution computation using a two-dimensional linear filter shown in FIG. 3A, and feeds the absolute value of the output as a horizontal edge signal h to the edge determining unit 224. The vertical edge detector 222 performs a convolution computation using a two-dimensional linear differential filter shown FIG. 3B, and feeds the absolute value of the output as a vertical edge signal v to the edge determining unit 224.

The process goes step S3. The edge determining unit 224 determines whether at least one of the values of the horizontal edge signal h and the vertical edge signal v is greater than the threshold T. When the edge determining unit 224 determines that one of the values of the horizontal edge signal h and the vertical edge signal v is greater than the threshold T, the edge determining unit 224 outputs a value, as edge information, indicative of an edge (for example 1), to store it in the edge map memory 226. When both values of the edge signals, h and v, are equal to or smaller than the threshold T, the edge determining unit 224 outputs a value, as edge information, indicative of not an edge (for example 0), to store it in the edge map memory 226.

The delay unit 223 delays the input image data by a duration the edge map memory 226 takes to store the edge information that it is necessary to perform the horizontal smoothing process and then outputs the image data to the horizontal smoothing unit 225.

Figure 22:
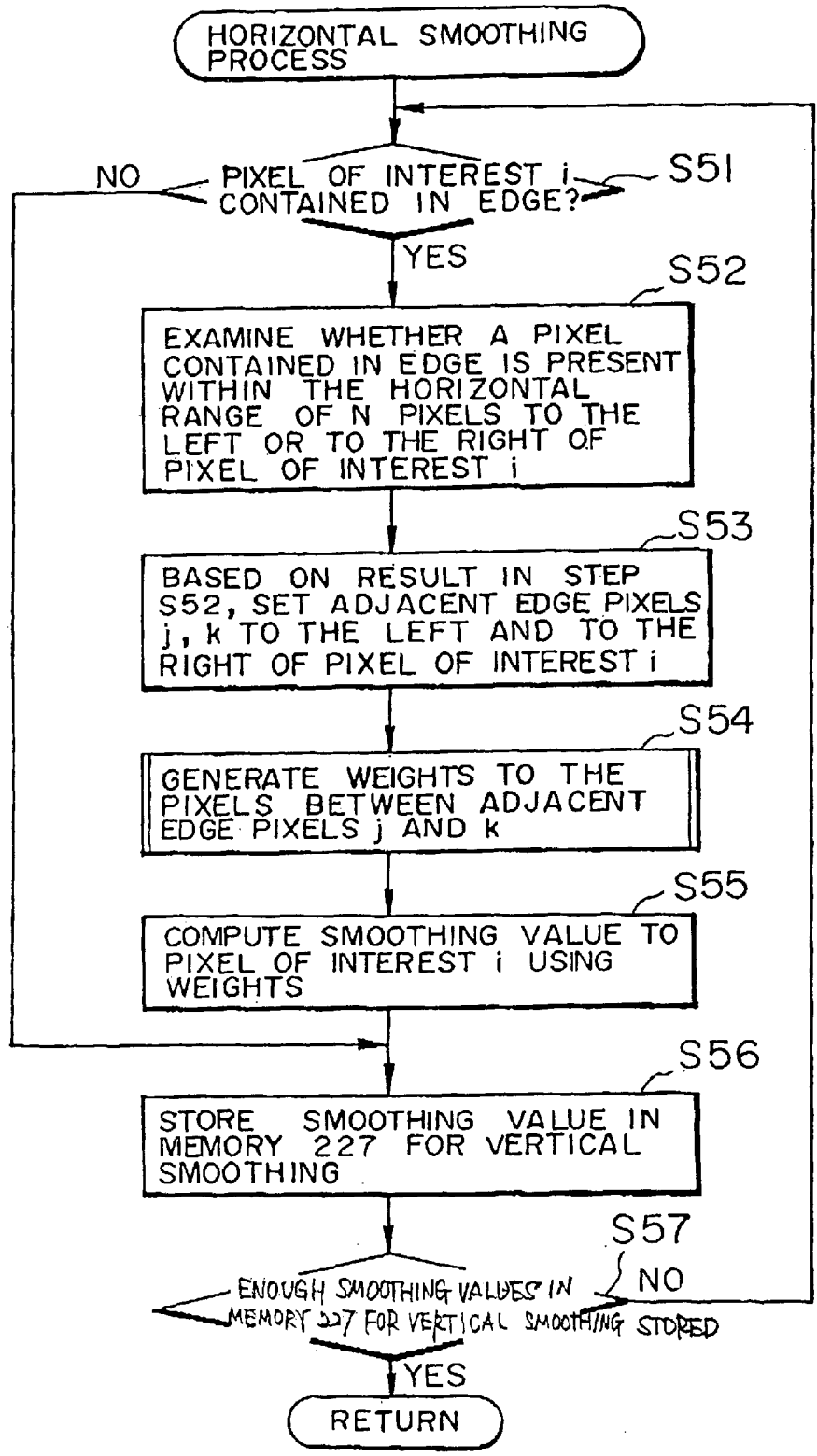
FIG. 22 is a flow diagram showing the process by a horizontal smoothing unit.

In step S4, only when a pixel of interest is not included in an edge, the horizontal smoothing unit 225 detects neighboring pixels included in the edge, generates weights for the pixels, and computes a smoothness value. The process by the horizontal smoothing unit 225 is now discussed referring to a flow diagram shown in FIG. 22.

It is determined in step S51 whether the pixel i of interest is included in the edge. When it is determined in step S51 that the pixel i of interest is included in the edge, the process goes to step S56, where the value of the pixel i of interest is stored in the vertical smoothing memory 227. When it is determined in step S51 that the pixel i of interest is not included in the edge, the process goes to step S52. Step S52 is for pixel detection process to determine which of the neighboring pixels is included in the edge. The horizontal smoothing unit 225 references the edge map memory 226 to determine whether a pixel included in the edge (edge pixel) is present within range of N pixels (neighboring area) to the left and to the right of the pixel i of interest.

Figure 5:
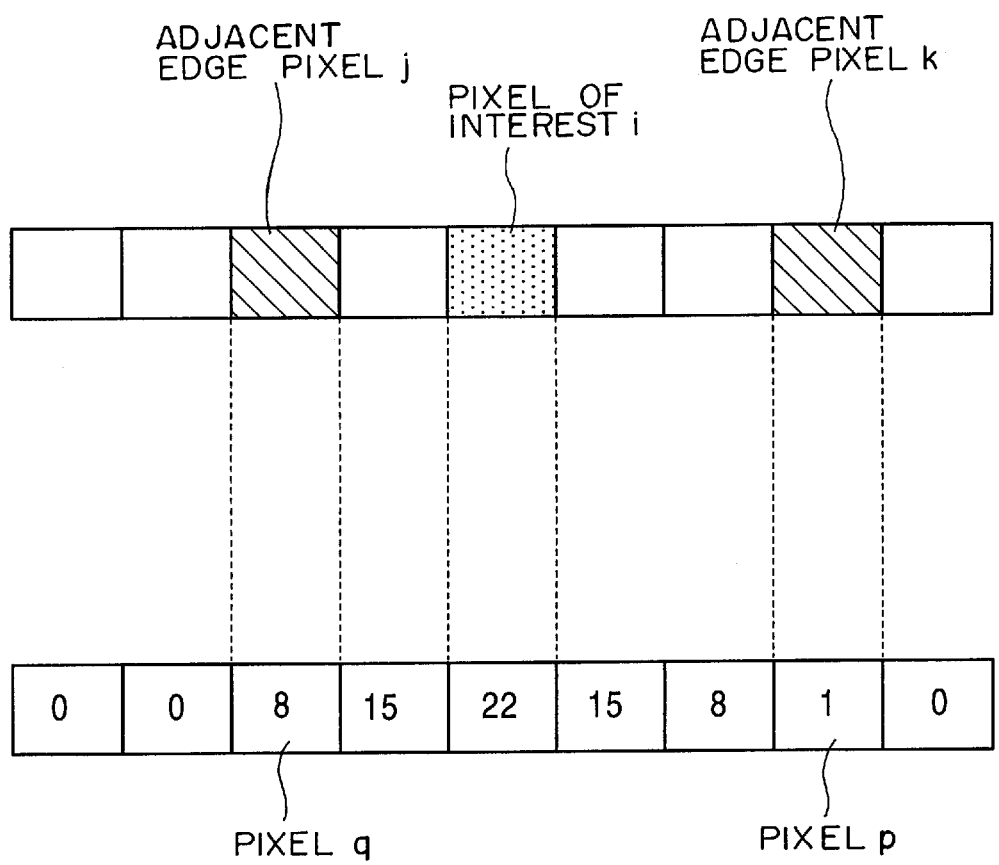
FIG. 5 shows an example of computation of weights.
Figure 6A:
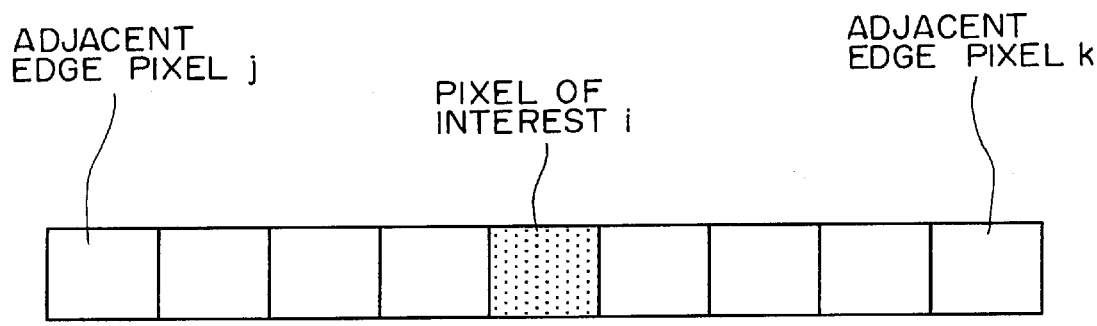
FIGS. 6A and 6B show an example of exceptional process in the detection of adjacent edge pixels.
Figure 6B:
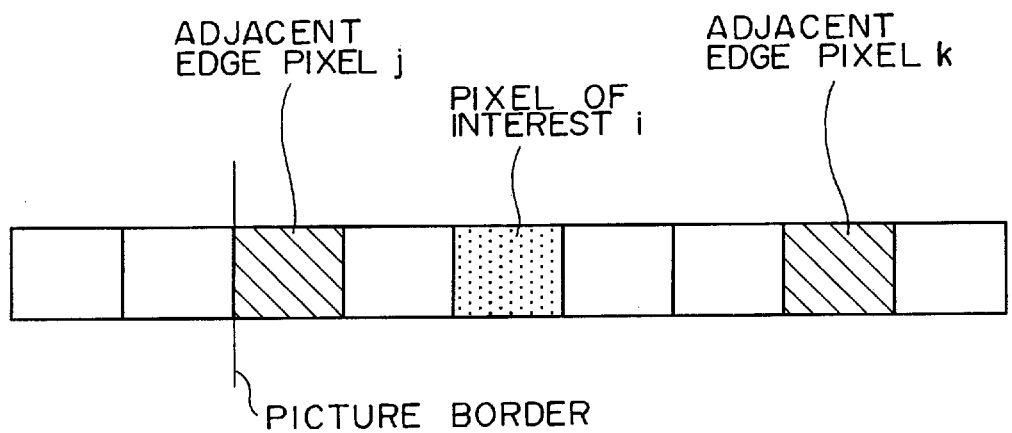

In step S53, let j represent the left pixel closest to the pixel i of interest (adjacent edge pixel) among the edge pixels present in the neighboring area to the left of the pixel of interest and let k represent the right pixel closest to the pixel of i of interest as shown in FIG. 5. When no edge pixel is present in each neighboring area, let j and k represent the pixels farthest apart from the pixel of interest within the respective neighboring areas as shown in FIG. 6A. When the neighboring area includes an outside area outside the screen border (an image-present area) with no edge pixel present between the pixel i of interest and the border, the pixel on the border is the adjacent edge pixel. In FIGS. 5 and 6, the size of the neighboring area N is set to 4, for example.

Figure 23:
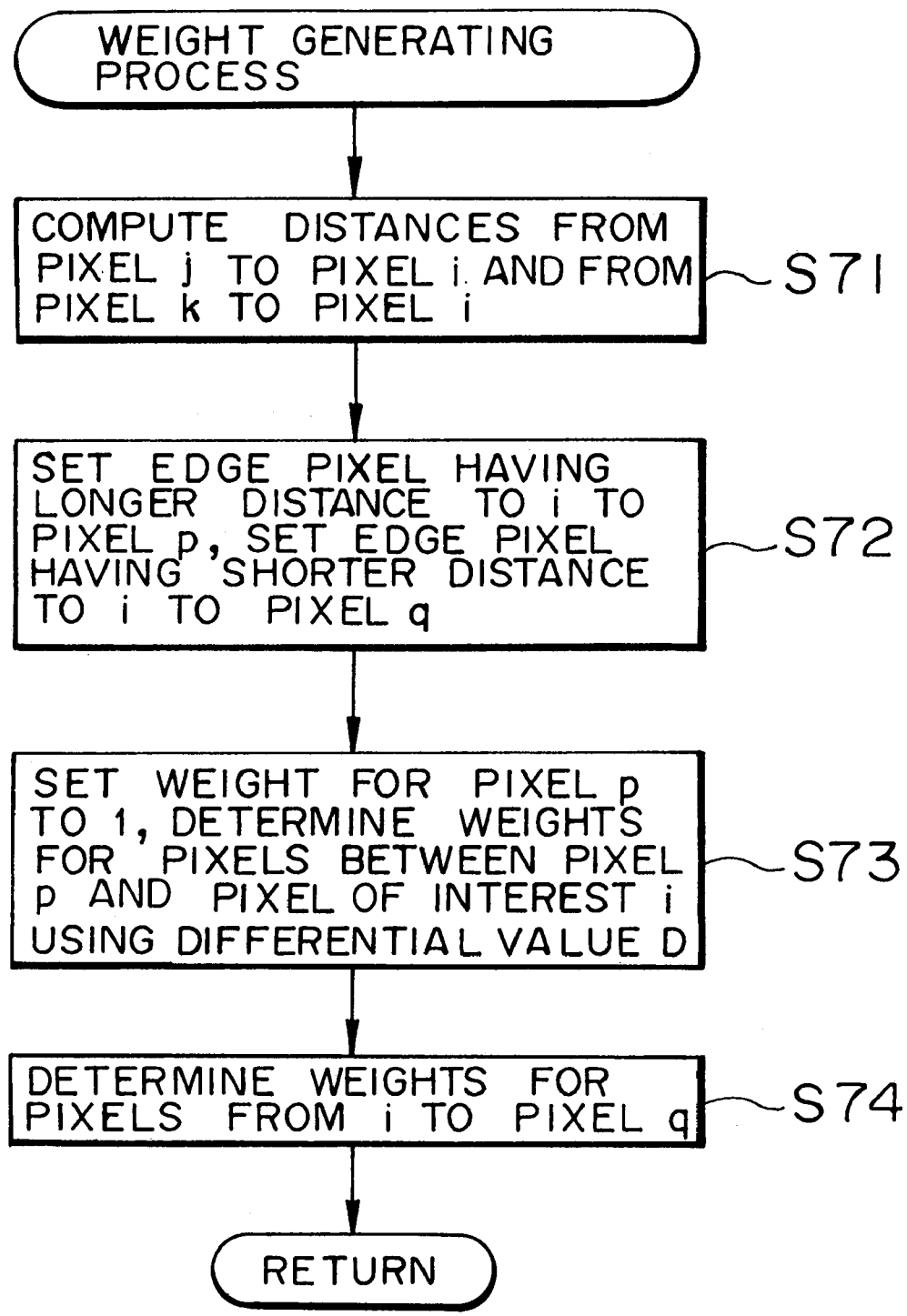
FIG. 23 is a flow diagram showing the generation of weights according to the first embodiment.

The process goes to step S54 to generate the weights for the pixels. The horizontal smoothing unit 225 generates the weights for the pixels between the adjacent edge pixel i and the adjacent edge pixel j. Referring to a flow diagram shown in FIG. 23, the weight generation process by the horizontal smoothing unit 225 is now discussed.

The horizontal smoothing unit 225 computes the distance between the pixel i of interest and each of the adjacent edge pixel j and the adjacent edge pixel k in step S71. In step S72, let p represent the pixel having a longer distance and q represent the pixel having a shorter distance to the pixel of interest.

Since the distance between the adjacent edge pixel j and the pixel i of interest is 2 and the distance between the adjacent edge pixel k and the pixel i of interest is 3 as shown in FIG. 5, the adjacent edge pixel k is the pixel p while the adjacent edge pixel j is the pixel q.

In step S73, the horizontal smoothing unit 225 sets the weight for the pixel p to 1 and then assigns, to the pixels ranging from the pixel next to the pixel p through to the pixel i of interest, weights in a sequentially increasing order from small to large with a difference of D between two neighboring pixels permitted. The value of D is a parameter for adjusting the degree of smoothness, and is 7 in the example in FIG. 5.

The process goes to step S74. The horizontal smoothing unit 225 assigns, to the pixels ranging from the pixel of interest through to the pixel q, weights in the sequentially decreasing order from large to small with the difference D between two neighboring pixels permitted.

The weights are set to the pixels from the pixel p to the pixel q (from the adjacent edge pixel j to the adjacent edge pixel k). When all weights are thus set, the process returns to the routine in the flow diagram shown in FIG. 22.

In step S55, the smoothness value for the pixel of interest is computed. The horizontal smoothing unit 225 computes a weighted mean using the weights of the pixels ranging from the adjacent edge pixel j through the adjacent edge pixel k according to equation (15), and outputs the result as a smoothness value for the pixel of interest.

$$x'(i) = \frac{\sum_{m \in R} w(m) \times (m)}{\sum_{m \in R} w(m)} \quad (15)$$

where x'(i) represents a smoothed value of the pixel i of interest, and R represents a set of pixels included within the neighboring areas to the left of and to the right of the pixel i of interest. x(m) is the value of a pixel m, prior to smoothing, as an element of the set R, and w(m) is the weight for the pixel m.

The smoothness value thus computed is once stored in the vertical smoothing memory 227 in step S56. The process goes to step S57. It is determined in step S57 whether the horizontal smoothing values for the (2N+1) lines, that it is necessary to perform the horizontal smoothing process are stored in the vertical smoothing memory 227. When it is determined that the process is not yet completed, the process returns to step S51 to repeat the above process. When it is determined that the process is completed, the process returns to the routine in the flow diagram shown in FIG. 21.

The process goes to step S5. When the vertical smoothing memory 227 stores the lines of data needed for smoothing, the vertical smoothing unit 228 computes the smoothness value to the vertically arranged data columns, out of the data stored in the vertical smoothing memory 227, on a column-by-column basis, referencing the edge information stored in the edge map memory 226.

Figure 24:
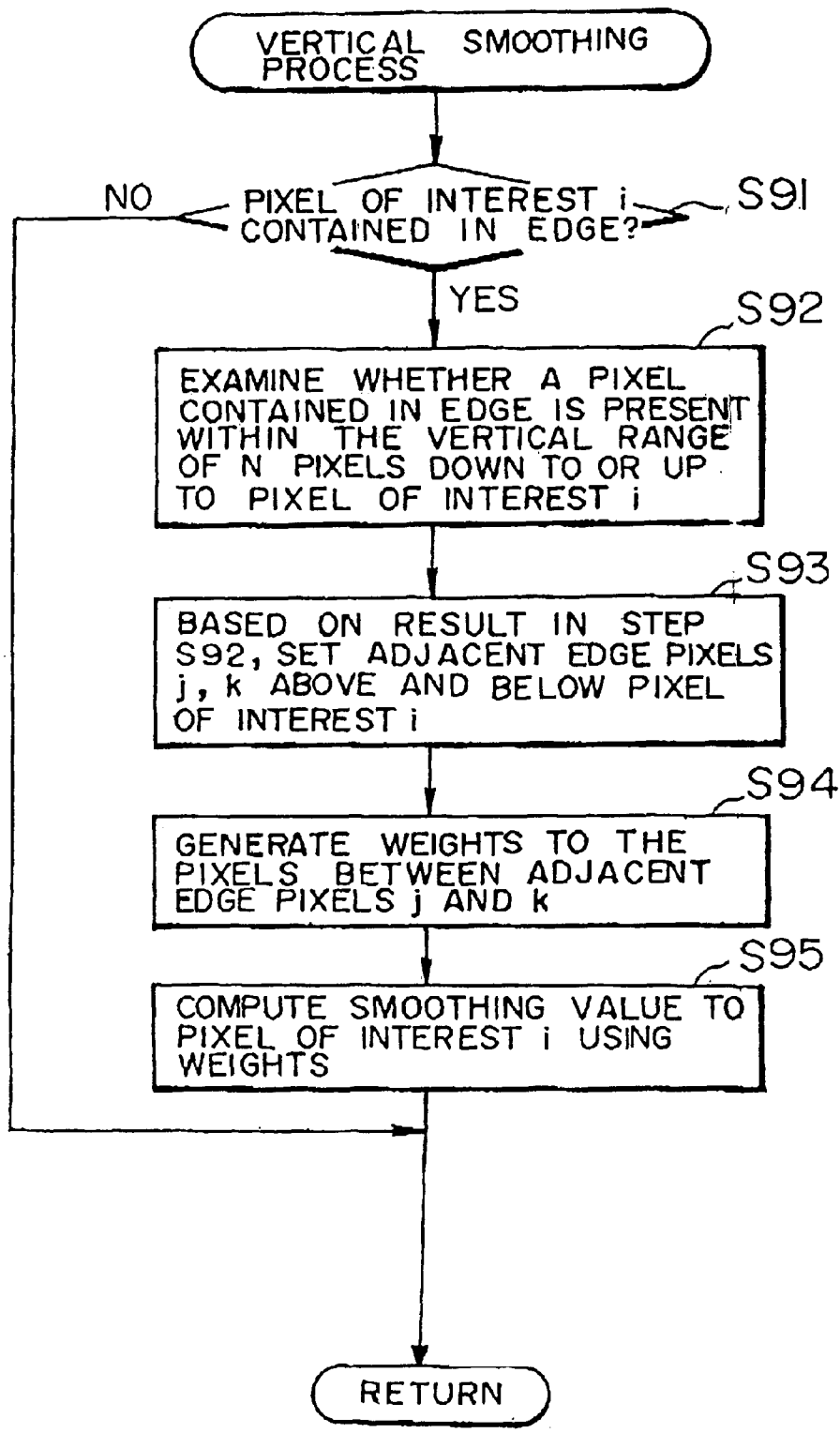
FIG. 24 is a flow diagram showing the process by a vertical smoothing unit.

When the pixel of interest is not included in the edge, the vertical smoothing unit 228 detects neighboring pixels that are included in the edge, generates weights for the pixels, and computes the smoothness value. Referring now to a flow diagram shown in FIG. 24, the process by the vertical smoothing unit 228 is discussed.

It is determined in step S91 whether the pixel i of interest is included in the edge. When it is determined in step S91 that the pixel i of interest is included in the edge, the process goes to step S96, where the value of the pixel i of interest is output as the smoothness value for the pixel i of interest. When it is determined in step S91 that the pixel i of interest is not included in the edge, the process goes to step S92. Step S92 is for pixel detection process to determine which of the neighboring pixels is included in the edge. The vertical smoothing unit 228 references the edge map memory 226 to determine whether a pixel included in the edge (edge pixel) is present within ranges of N pixels above and below the pixel i of interest.

In step S93, let j represent the upper pixel closest to the pixel i of interest (adjacent edge pixel) among the edge pixels present in the neighboring area above the pixel of interest and let k represent the lower pixel closest to the pixel of i of interest. When no edge pixel is present in each neighboring area, let j and k represent the pixels farthest apart from the pixel of interest within the respective neighboring areas. When the neighboring area includes an outside area outside the screen border with no edge pixel present between the pixel i of interest and the border, the pixel on the border is the adjacent edge pixel.

The process goes to step S94. To generate the weights for the pixels, the vertical smoothing unit 228 computes the distance between the pixel i of interest and each of the adjacent edge pixel j and the adjacent edge pixel k, and lets p represent the pixel having a longer distance and q represent the pixel having a shorter distance to the pixel of interest, and generates the weights for the pixels between the adjacent edge pixel i and the adjacent edge pixel j according to the flow diagram shown in FIG. 23 in the same way as the horizontal smoothing unit 225.

The process goes to step S95. Using the weights for the pixels ranging from the adjacent edge pixel j through the adjacent edge pixel k, the vertical smoothing unit 228 computes a weighted mean according to equation (15), and outputs the result as a smoothness value for the pixel of interest. And then the process returns to the routine in the flow diagram shown in FIG. 21. In step S6, the smoothed decoded pixel is output.

Since the ringing noise corrector 201 smoothes the area other than the edge in the image in this way, noise including ringing noise is reduced without degrading the edge.

In the first embodiment, both the horizontal smoothing unit 225 and vertical smoothing unit 228 employ the same equation (15) to compute the smoothness value. Alternatively, they may employ different equations.

In the first embodiment, the filters shown in FIGS. 3A and 3B are used as the ones for edge detection. Other filters may be used.

In the above discussion, the difference between luminance signal and color-difference signal has not particularly been described. In practice, the same process is performed to both signals. Alternatively, edge detection may be made in the luminance signal only, and the resulting edge information may be used to smooth luminance information and the color-difference information. The difference D between the weights of two neighboring pixels, which determines the degree of smoothing, and the size of the neighboring area N may be differently set, with those for the luminance signal being different from those for the color-difference signal.

Discussed next is an image decoding apparatus according to a second embodiment of the image processing apparatus of the present invention.

The construction of the second embodiment remains unchanged from that of the first embodiment (FIG. 1). The difference therebetween lies in the memory arrangement of the edge map memory 226 in the ringing noise corrector 201, and the operation of the horizontal edge detector 221, vertical edge detector 222, edge determining unit 224, horizontal smoothing unit 225 and vertical smoothing unit 228.

The horizontal edge detector 221 and vertical edge detector 222 in the second embodiment performs linear filtering (convolution integral) using the edge detection filters shown in FIGS. 3A and 3B, and provides the output of the edge detection filters as a horizontal edge signal h and a vertical edge signal v.

Unlike the first embodiment which determines through a binarizing process whether a pixel of interest is an edge, the edge determining unit 224 computes an edge coefficient indicating the probability that the pixel of interest is an edge, based on the horizontal edge signal h and the vertical edge signal v respectively provided by the horizontal edge detector 221 and vertical edge detector 222, and the edge coefficient a is stored in the edge map memory 226. The edge coefficient a is computed according to equation (16), for example.

$$a(i) = \begin{pmatrix} 0.0 \ldots e(i) < TH1 \\ \dfrac{e(i) - TH1}{TH2 - TH1} \ldots TH1 \leq e(i) < TH2 \\ 1.0 \ldots TH2 \leq 2e(i) \end{pmatrix} \quad (16)$$

where a(i) is the edge coefficient at the pixel i, and h(i) and v(i) are the values of the horizontal edge signal and vertical edge signal at the pixel i. e(i) represents an edge strength, and is computed as a root-mean-square value of the outputs of the two edge detectors 221, 222 as expressed by equation (17).

$$e(i) = \sqrt{h(i)^2 + v(i)^2} \quad (17)$$

Figure 7:
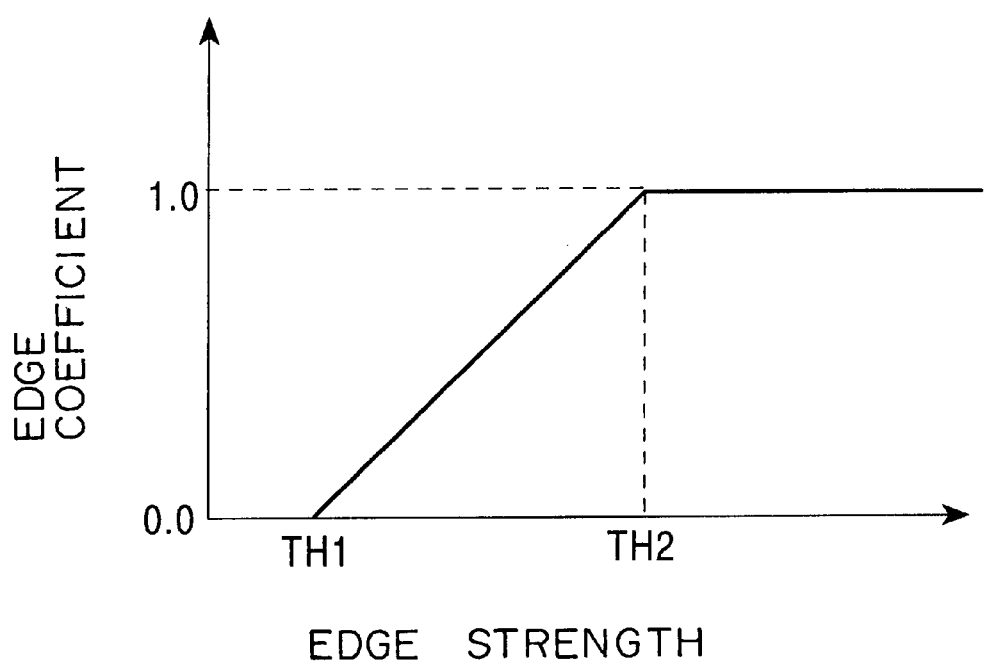
FIG. 7 shows the relationship between edge strength and edge coefficient.

The edge strength, which is normalized by predetermined thresholds TH1 and TH2 as shown in FIG. 7, is used as an edge coefficient.

The use of the edge coefficient a makes the corrected image visually comfortable.

Each cell in the edge map memory 226 in the second embodiment is different from the one in the first embodiment in that it is constructed of bits, the number of which is large enough to store at a sufficiently high accuracy level the edge coefficient a which may be continuous value.

Figure 25:
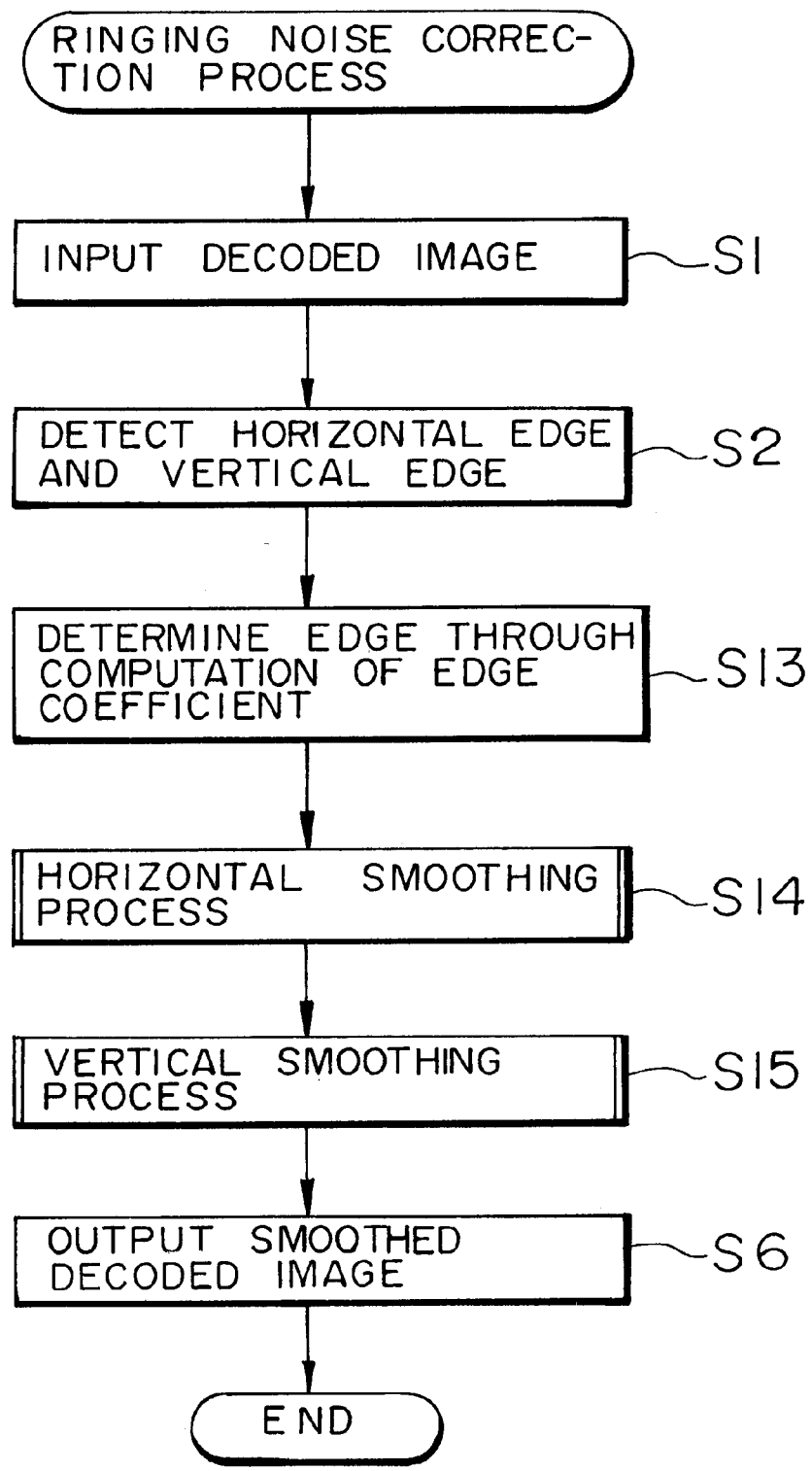
FIG. 25 is a flow diagram showing the process by a ringing noise corrector of the second embodiment.

Referring to a flow diagram shown in FIG. 25, the process by the ringing noise corrector 201 of the second embodiment is now discussed. Like steps are identified with like reference numerals, and the discussion about them are accordingly shortened.

In step S1, the image signal from the image adder 44 is fed to the horizontal edge detector 221, the vertical edge detector 222 and the delay unit 223.

In step S2, the horizontal edge detector 221 and vertical edge detector 222 performs a linear filtering (a convolution integral) using the edge detection filters shown in FIGS. 3A and 3B, and provide the outputs of the edge detection filters as a horizontal edge signal h and a vertical edge signal v to the edge determining unit 224.

In step S13, the edge determining unit 224 computes an edge coefficient indicating the probability that the pixel of interest is an edge, based on the horizontal edge signal h and the vertical edge signal v respectively provided by the horizontal edge detector 221 and vertical edge detector 222, according to equation (16). The edge coefficient a is stored in the edge map memory 226.

The delay unit 223 delays the input image data by a duration the edge map memory 226 takes to store the edge information that it is necessary to perform the horizontal smoothing process and outputs the image data to the horizontal smoothing unit 225.

Figure 26:
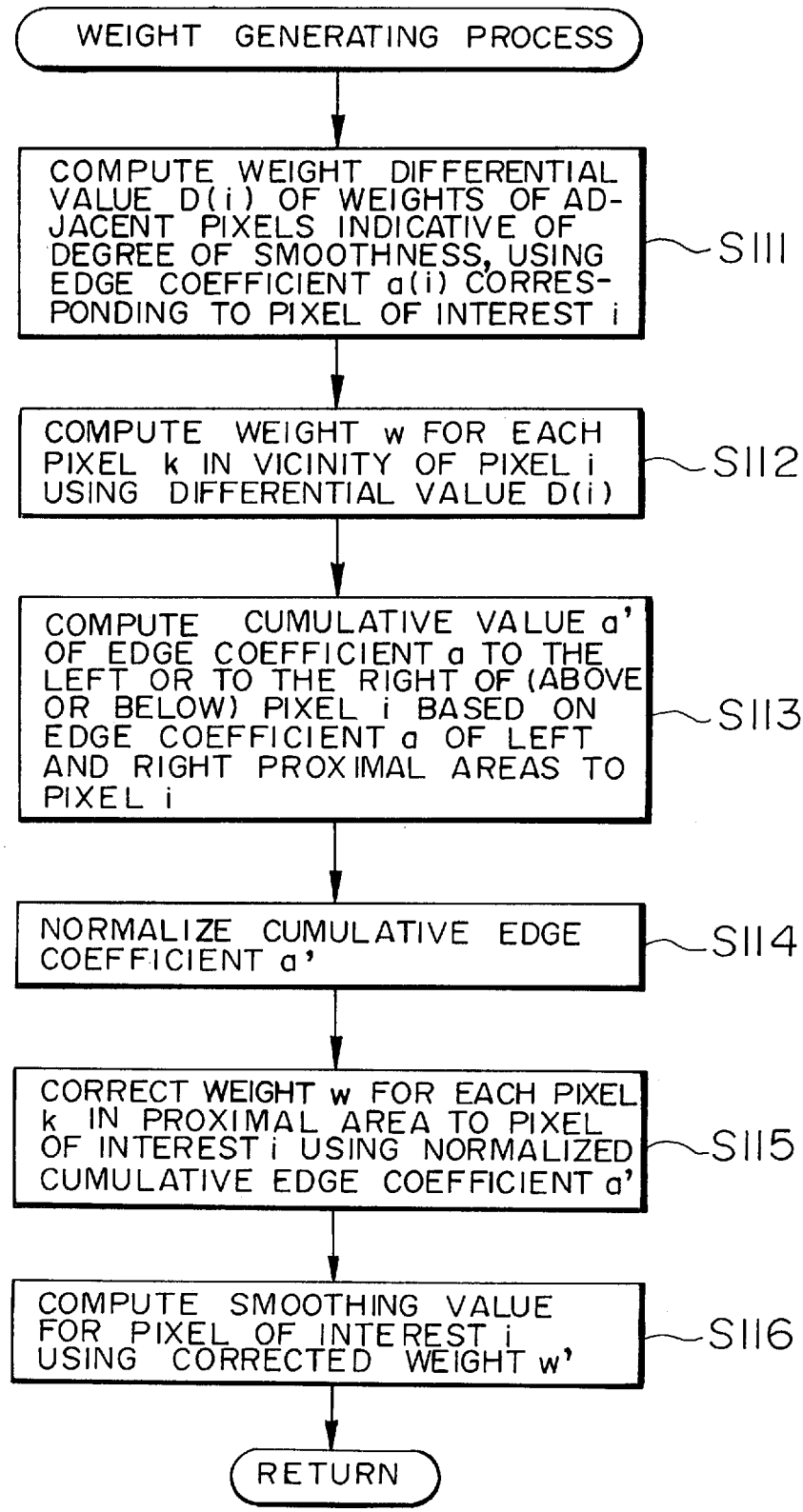
FIG. 26 is a flow diagram showing the generation of weights according to the second embodiment.

In step S14, only when a pixel of interest is not included in an edge, the horizontal smoothing unit 225 computes the differential value D between the weights, generates the weights for the pixels, computes a cumulative edge coefficient (a cumulative value of the edge coefficients of the pixels in the neighboring area), corrects the weights, and computes a smoothness value. The operation of the horizontal smoothing unit 225 remains unchanged from that of the first embodiment, except for the computation method of the weights. The computation method of the weights in the second embodiment is now discussed referring to a flow diagram shown in FIG. 26.

In step S111, the horizontal smoothing unit 225 computes a differential value D(i) between the weights of the neighboring pixels, indicative of the degree of smoothing, according to equation (18).

$$D(i) = D\max \times (1 - a(i)) \quad (18)$$

where Dmax is a maximum value of the differential value D between predetermined neighboring pixels.

Figure 8:
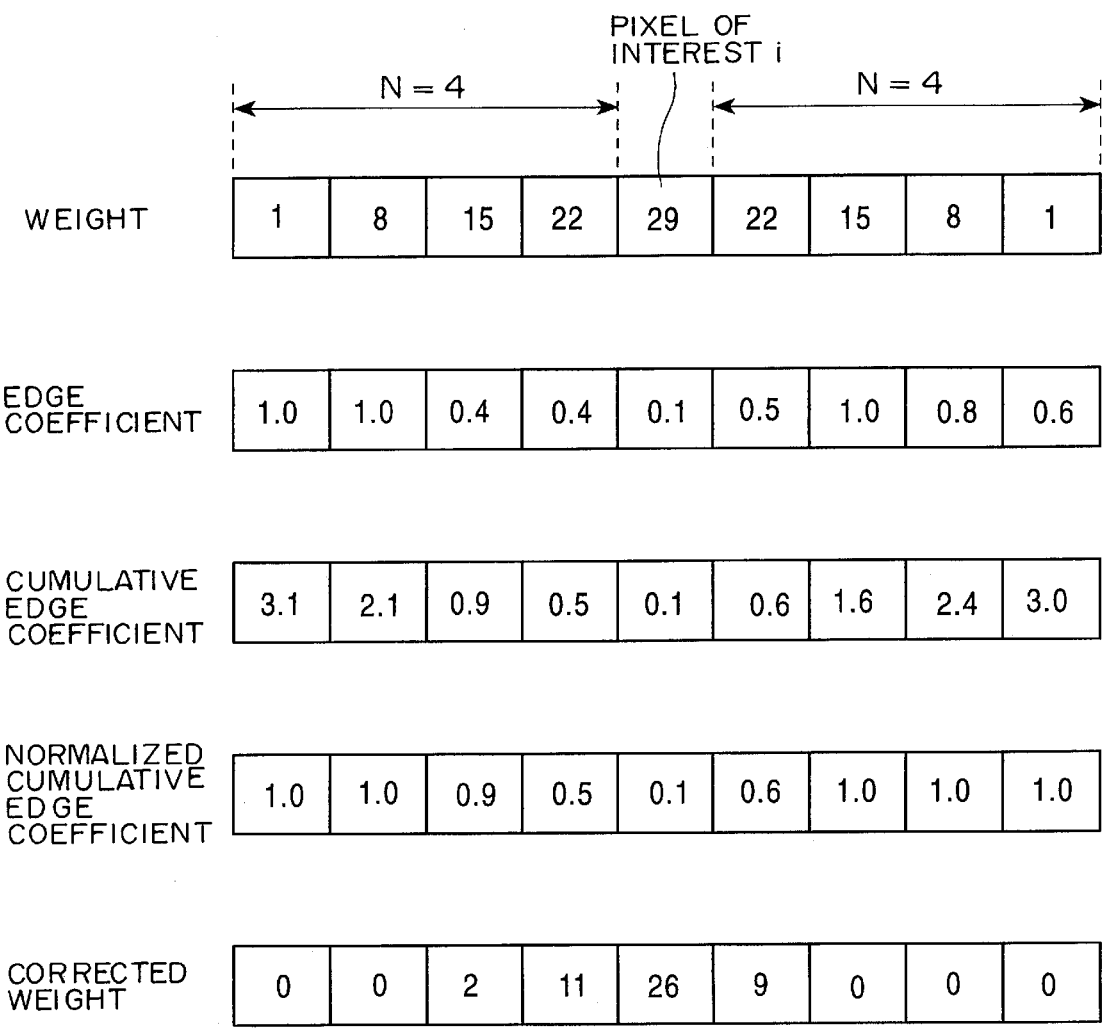
FIG. 8 shows corrected weights according to a second embodiment.

In step S112, the horizontal smoothing unit 225 computes the weights w of the neighboring pixels neighboring to the pixel i of interest as shown in FIG. 8, using the computed differential value D(i), like the horizontal smoothing unit 225 in the first embodiment.

In step S113, the horizontal smoothing unit 225 reads the edge coefficients a in the neighboring areas to the left of and to the right of the pixel i of interest, and computes sequentially cumulative values a' (cumulative edge coefficients) of the edge coefficients a leftward and rightward from the pixel i of interest.

In the neighboring area of the pixel i of interest, the cumulative edge coefficient a'(i+n) of the pixel (i+n) at n-th pixel from the pixel i is computed according to equation (19).

$$a'(i+n) = \begin{pmatrix} \sum_{l=0}^{n} a(i+l) \ldots N \geq n > 0 \\ \sum_{l=n}^{-1} a(i+l) \ldots -N \leq n < 0 \end{pmatrix} \quad (19)$$

In step S114, the horizontal smoothing unit 225 normalizes the cumulative edge coefficients in the same manner as in equation (16), so that they are equal to or greater than 0 but equal to or smaller than 1. The thresholds TH1 and TH2 for normalization are not necessarily equal to those used in the normalization of the edge coefficients a.

FIG. 8 shows the cumulative edge coefficients when normalization is carried out with TH1 and TH2 respectively set to 0 and 1.

In step S115, the horizontal smoothing unit 225 corrects the weights w for the pixels k within the area neighboring to the pixel of interest using the normalized cumulative edge coefficients a' according to equation (20).

$$w'(k) = w(k) \times (1 - a'(k)) \quad (20)$$

The larger the cumulative edge coefficient a' of the pixel, the weight w of the pixel is modified less.

In step S116, the horizontal smoothing unit 225 computes the smoothness value of the pixel of interest according to equation (15) using the corrected weight w' in the same way as the first embodiment.

The smoothness value thus computed is once stored in the vertical smoothing memory 227.

When the vertical smoothing memory 227 stores the lines of data needed for vertical smoothing, the vertical smoothing unit 228 computes the smoothness value of the vertically arranged data columns, out of the data stored in the vertical smoothing memory 227, on a column-by-column basis, referencing the edge information stored in the edge map memory 226 in step S15 in the flow diagram in FIG. 25.

When a pixel of interest is not included in an edge, the horizontal smoothing unit 225 computes, in connection with the pixel, the differential value D between the weights, generates the weights for the pixels, computes cumulative edge coefficients, corrects the weights, and computes a smoothness value. The operation of the vertical smoothing unit 228 remains unchanged from that of the first embodiment, except for the computation method of the weights. The computation method of the weights in the vertical smoothing unit 228 is identical to that in the horizontal smoothing unit except that the neighboring pixels in the vertical smoothing process are set in a vertical direction rather than in a horizontal direction. The computation method of the weights is discussed again referring to a flow diagram shown in FIG. 26.

In step S111, the vertical smoothing unit 228 computes a differential value D(i) between the weights of the neighboring pixels, indicative of the degree of smoothing, according to equation (18).

In step S112, the vertical smoothing unit 228 computes the weights w of the neighboring pixels neighboring to the pixel i of interest using the computed differential value D(i) in the same way as the vertical smoothing unit 228 in the first embodiment.

In step S113, the vertical smoothing unit 228 reads the edge coefficients a in the neighboring areas above and below the pixel i of interest, and computes sequentially cumulative values a' (cumulative edge coefficients) of the edge coefficients a above and below the pixel i of interest.

In the neighboring area of the pixel i of interest, the cumulative edge coefficient a'(i+n) of the pixel (i+n) at n-th pixel from the pixel i is computed according to equation (19).

In step S114, the vertical smoothing unit 228 normalizes the cumulative edge coefficients so that they are equal to or greater than 0 but equal to or smaller than 1.

In step S115, the vertical smoothing unit 228 corrects the weights w for the pixels within the area neighboring to the pixel of interest using the normalized cumulative edge coefficients a' according to equation (20).

In step S116, the vertical smoothing unit 228 computes the smoothness value of the pixel of interest according to equation (15) using the corrected weight w' in the same way as the first embodiment.

In this way the ringing noise corrector 201 smoothes each pixel horizontally and vertically to reduce ringing noise. Since the edge strength takes a continuous value in the second embodiment, ringing noise is reduced more.

Used as the edge strength e(i) in the above embodiments is the root-mean-square value of the outputs h and v of the two edge detectors 221, 222 (equation (17)). Alternatively, the sum of the squares ($h^2+v^2$) or the sum of the absolute values (|h|+|v|) of the outputs of the horizontal edge detector 221 and vertical edge detector 222 may be used.

Figure 9:
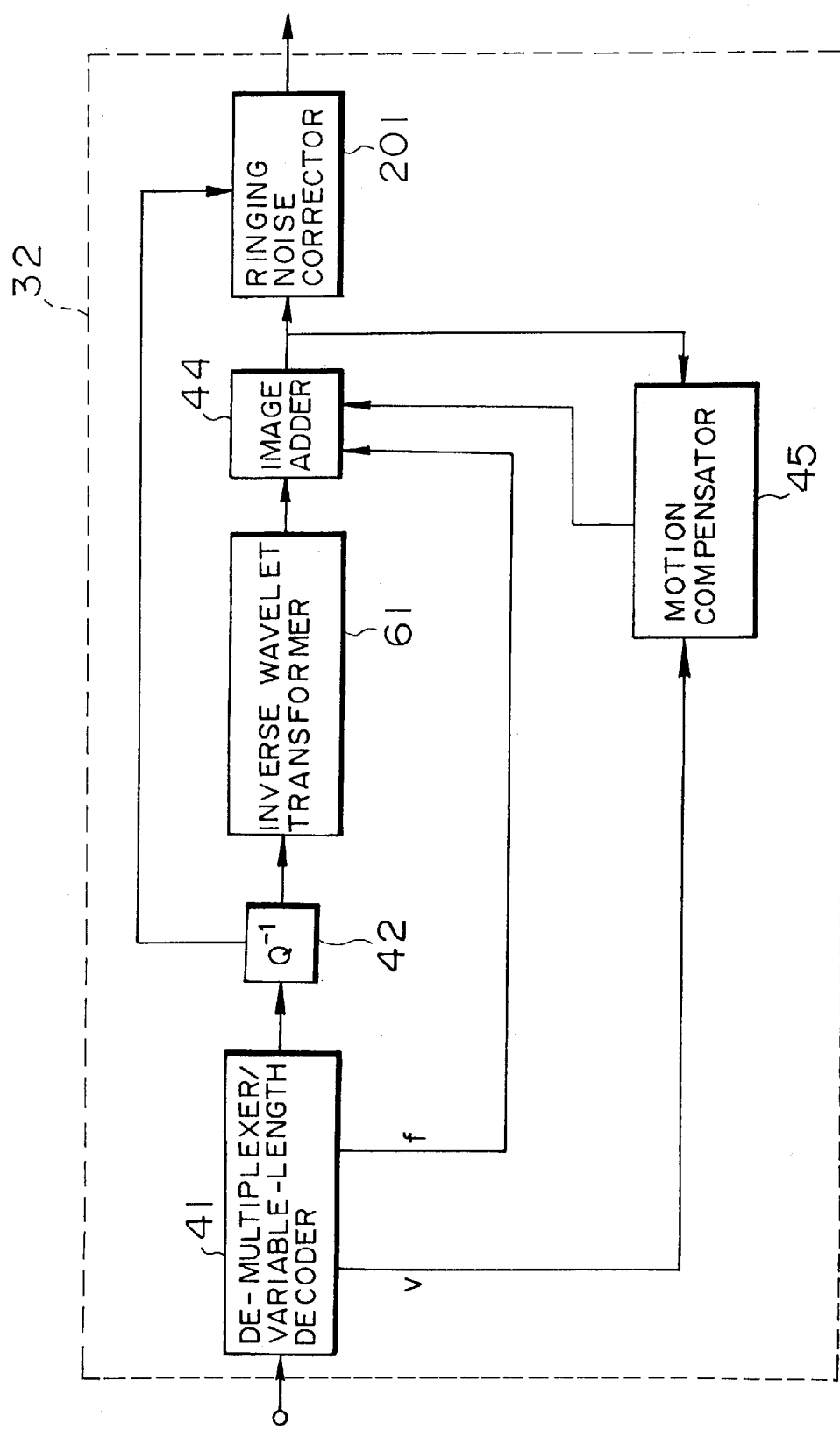
FIG. 9 is a block diagram showing an image decoding apparatus according to a second embodiment of the image processing apparatus of the present invention.
Figure 10:
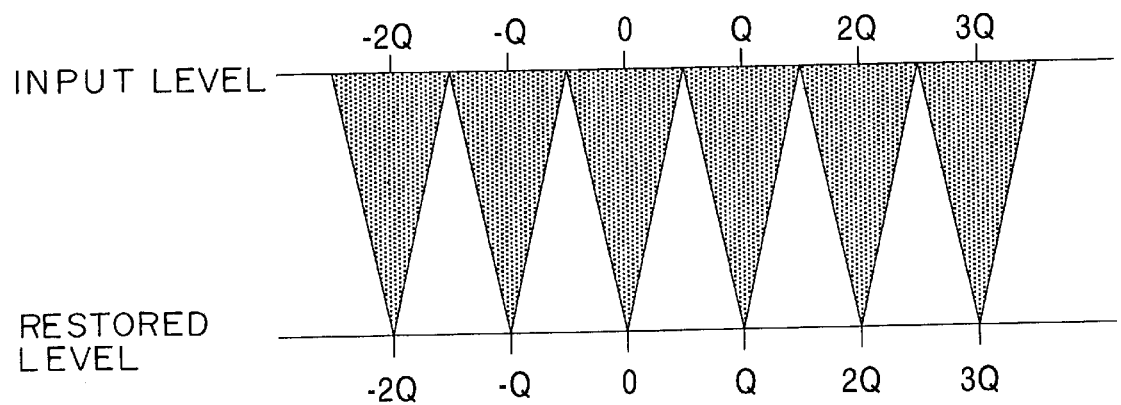
FIG. 10 shows the relationship between an input level and a restored level in linear quantization and inverse quantization processes.
Figure 11:
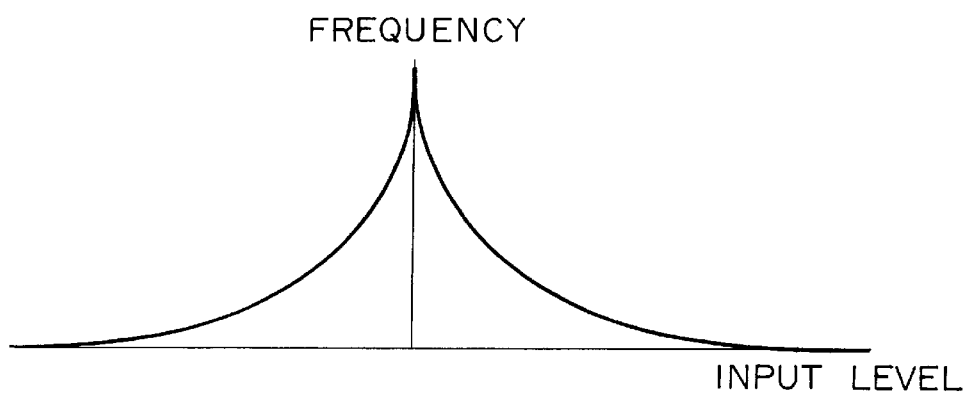
FIG. 11 shows a data distribution.
Figure 12:
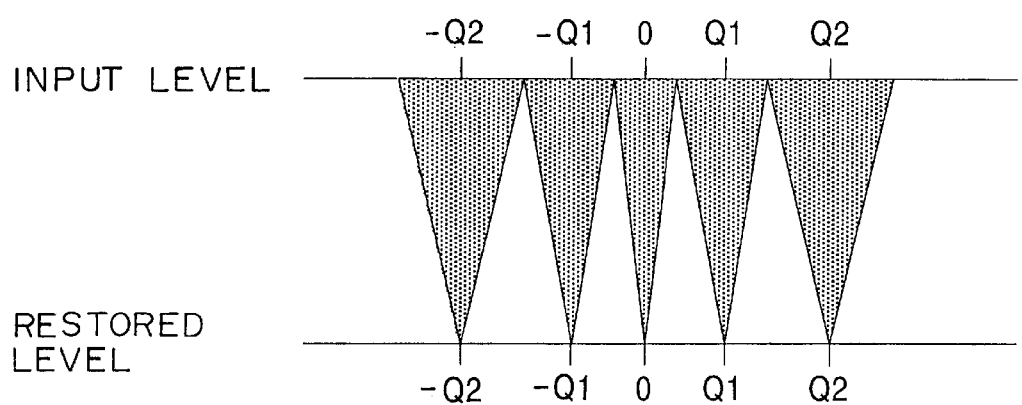
FIG. 12 shows the relationship between an input level and a restored level in nonlinear quantization and inverse quantization processes.
Figure 13:
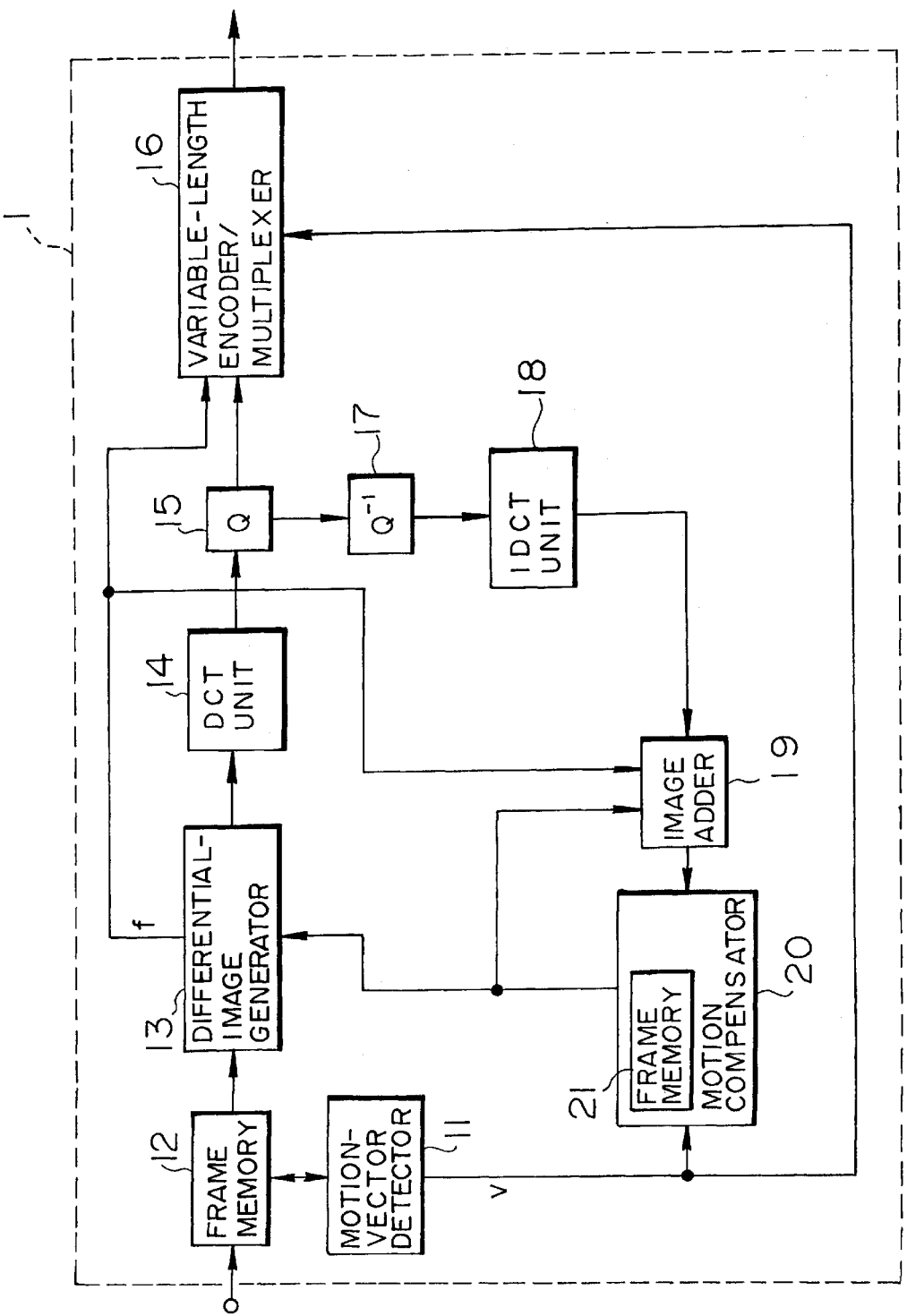
FIG. 13 is a block diagram showing one conventional moving image coding apparatus.
Figure 14:
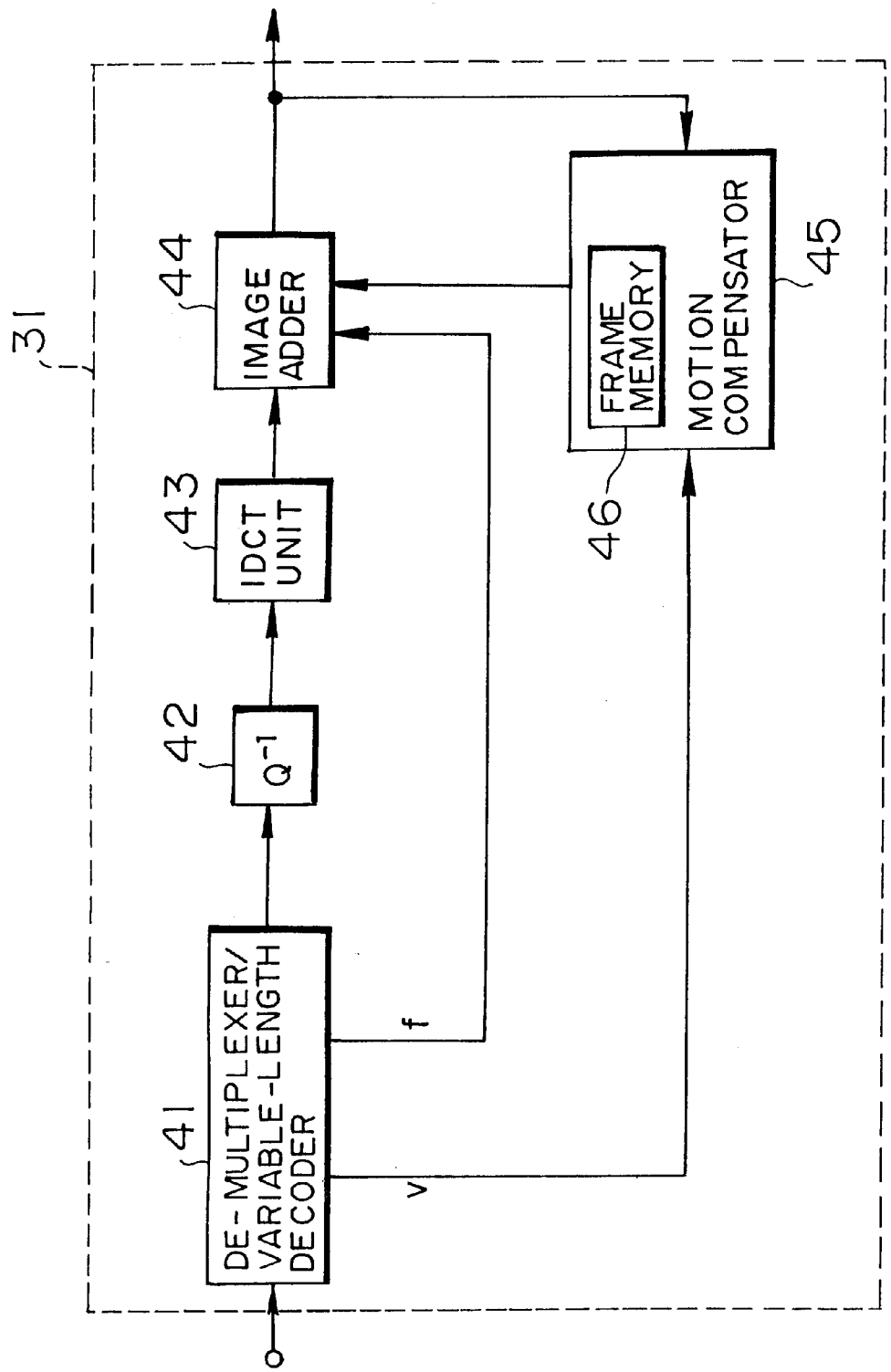
FIG. 14 is a block diagram showing one conventional moving image decoding apparatus.

FIG. 9 is a block diagram of an image decoding apparatus 32 according to a third embodiment of the image processing apparatus of the present invention.

The third embodiment is identical to the first embodiment in construction. The difference therebetween lies in that a quantization step Q used by the inverse quantizer 42 is fed to the ringing noise corrector 201 and in the operation of the edge determining unit 224, horizontal smoothing unit 225, and vertical smoothing unit 228 in the ringing noise corrector 201.

The edge determining unit 224 in the ringing noise corrector 201 computes a threshold T in accordance with the quantization step Q from the inverse quantizer 42 according to equation (21), and perform edge determination based on the threshold.

$$T=Q/C1 \qquad (21)$$

where C1 is a predetermined constant.

The horizontal smoothing unit 225 and vertical smoothing unit 228 in the ringing noise corrector 201 compute the size N of the neighboring area in accordance with the quantization step Q from the inverse quantizer 42 according to equation (22), and perform smoothing processes in accordance with N.

$$N=Q/C2 \qquad (22)$$

where C2 is a predetermined constant.

By setting T and N in accordance with the quantization step Q, the smoothing process has priority when the quality of an image to be reproduced is poor (namely, Q is large), and the preservation of the edge has priority when the quality of the image to be reproduced is excellent (namely, Q is small). Either way an excellent image is reproduced.

The operation of the third embodiment is identical to that of the first embodiment except that the threshold T and the neighboring area size N are respectively computed from the quantization step Q. The description of the operation of the third embodiment is thus skipped.

In the coding process using the wavelet conversion, the quantization step Q may be modified according to the unit of the entire sequence of the process, on a frame-by-frame basis, on a per sub-band basis, or on a coefficient tree basis (tree is a set of coefficients having the same position and the same direction). In the coding process in the above embodiment, the threshhhold T and the neighboring area size N, are varied on a frame-by-frame basis or on a larger scale unit basis.

In this embodiment, the quantization step information is fed from the inverse quantizer 42 to the ringing noise corrector 201 to compute the threshold T and the neighboring area size N. Alternatively, if the bit stream includes such information, it may be used.

Although the threshold T and the neighboring area size N are computed from the quantization step Q according to equations (21) and (22), other equations may be used to derive these values from the quantization step Q.

An image decoding apparatus of a fourth embodiment of the image processing apparatus of the present invention is now discussed.

The fourth embodiment is identical to the third embodiment (FIG. 9) in construction. The difference therebetween lies in the memory arrangement of the edge map memory 226 in the ringing noise corrector 201 and in the operation of the horizontal edge detector 221, vertical edge detector 222, edge determining unit 224, horizontal smoothing unit 225 and vertical smoothing unit 228.

Like the horizontal edge detector 221 and vertical edge detector 222 in the second embodiment, the horizontal edge detector 221 and vertical edge detector 222 in the fourth embodiment performs the linear filtering (convolution integral) using the edge detection filters shown in FIGS. 3A and 3B, and provide the outputs of the edge detection filters as a horizontal edge signal h and a vertical edge signal v.

The edge determining unit 224 computes an edge coefficient a indicating the probability that the pixel of interest is an edge, based on the horizontal edge signal h and the vertical edge signal v respectively provided by the horizontal edge detector 221 and vertical edge detector 222, according to equation (16). The edge coefficient a is stored in the edge map memory 226.

The edge determining unit 224 computes beforehand the two thresholds TH1 and TH2 used in equation (16) from the quantization step Q according to equations (23) and (24).

$$TH1 = Q/C3 \quad (23)$$

$$TH2 = Q/C4 \quad (24)$$

where C3 and C4 are predetermined constants.

Each cell in the edge map memory 226 in the second embodiment is identical to the one in the second embodiment in that it is constructed of bits, the number of which is large enough to store at a sufficiently high accuracy level the edge coefficient which may be continuous value.

The horizontal smoothing unit 225 and vertical smoothing unit 228 compute the size N of the neighboring area in accordance with the quantization step Q from the inverse quantizer 42 according to equation (22) in the same way as the third embodiment, and perform smoothing processes In accordance with N.

In the coding process using the wavelet conversion, the quantization step Q may be modified according to the unit of the entire sequence of the process, on a frame-by-frame basis, on a per sub-band basis, or on a coefficient tree basis (tree is a set of coefficients having the same position and the same direction). In the coding process in the above embodiment, the threshhold T and the neighboring area size N, are varied on a frame-by-frame basis or on a larger scale unit basis.

In the embodiment, the quantization step information is fed from the inverse quantizer 23 to the ringing noise corrector 201 to compute the thresholds TH1 and TH2 and the neighboring area size N. Alternatively, if the bit stream includes such information, it may be used.

Although the thresholds TH1 and TH2 and the neighboring area size N are computed from the quantization step Q according to equations (22) through (24), other equations may be used to derive these values from the quantization step Q.

The degree of smoothing (namely, the differential value D of the weights) may be adjusted in accordance with the quantization step D. In such a case, the horizontal smoothing unit 225 and vertical smoothing unit 228 set the maximum Dmax of the neighboring differential values in accordance with the value of the quantization step Q.

As will be understood from the following equation (25), the larger the quantization step Q, the smaller the value of Dmax. With this arrangement, the degree of smoothing is adjusted in accordance with the image quality defined by the quantization step Q. More particularly, the lower the image to be reproduced, the higher the degree of smoothing.

$$Dmax = C5/Q \quad (25)$$

where C5 is a predetermined constant.

The relationship between the quantization step Q and Dmax is not limited to the one expressed by equation (25). Another equation may be employed.

According to the image processing apparatus and the image processing method of the present invention, noise generated in the plain area is reduced without degrading the edge of the image by detecting the edge information of a predetermined pixel in response to a spatial change in the pixel value of the image signal and by performing a smoothing process to a pixel selected in accordance with the edge information.

By using the edge coefficient indicating the probability that the pixel of interest is an edge, the ringing-noise corrected image is made visually comfortable.

By using the quantization step for the decoding process, the ringing noise correction is performed in accordance with the quality of the image to be reproduced.

Many variations and modifications will be employed without departing from the scope of the present invention, and the present invention is not limited to the above-described specific embodiments.

What is claimed is:

1. An image processing apparatus for performing a smoothing process on a decoded image signal having pixel values of a plurality of pixels, said apparatus comprising:

detection means for detecting edge information of a pixel in response to a spatial change in the pixel values of said image signal and comprising a two-dimensional linear differential filter to filter the image signal, said detection means computes the edge information that represents a comparison result of the output value of said filter with a predetermined threshold value;

smoothing means responsive to the edge information for performing the smoothing process on said image signal based on said edge information; decoding means for decoding a coded image signal, said coded image signal being a signal coded through at least a quantization process;

said decoding means inverse quantizes said coded image signal according to a predetermined quantization step; and said detection means sets said threshold value in accordance with the value of said quantization step.

2. An image processing apparatus according to claim 1, wherein said detection means increases said threshold value as the value of the quantization step increases.

3. An image processing apparatus for performing a smoothing process on a decoded image signal having pixel values of a plurality of pixels, said apparatus comprising:

detection means for detecting edge information of a pixel in response to a spatial change in the pixel values of said image signal and comprising a two-dimensional linear differential filter to filter the image signal, said detection means computes in accordance with the output of said filter, as said edge information, an edge coefficient representing the probability that said pixel is included in an edge;

smoothing means for performing the smoothing process on said image signal in accordance with said edge coefficient;

decoding means for decoding a coded image signal, wherein said coded image signal is a signal coded through at least a quantization process;

said decoding means inverse quantizes said coded image signal according to a predetermined quantization step; and said detection means determines said edge coefficient in accordance with the value of said quantization step;

wherein said detection means increases the threshold value as the value of the quantization step increases.

4. An image processing apparatus for performing a smoothing process on a decoded image signal having pixel values of a plurality of pixels, said apparatus comprising:

detection means for detecting edge information of a pixel in response to a spatial change in the pixel value of said image signal and comprising a two-dimensional linear differential filter to filter the image signal, said detection means computes in accordance with the output of said filter, as said edge information, an edge coefficient representing the probability that said pixel is included in an edge; and smoothing means for performing the smoothing process on said image signal in accordance with said edge coefficient;

wherein said smoothing means adjusts the degree of smoothing in accordance with the value of the edge coefficient for the pixel; and, wherein said smoothing means reduces the degree of smoothing as the edge coefficient value for the pixel increases.

5. An image processing method for performing a smoothing process on a decoded image signal having pixel values of a plurality of pixels, said method comprising the steps of:

decoding a coded image signal to obtain said decoded image signal, said decoding including inverse quantizing said coded image signal according to a quantization step;

detecting edge information of a pixel in response to a detected spatial change in the pixel values of said decoded image signal, said detecting including setting a threshold value in accordance with the value of said quantization step, filtering the decoded image signal using a two-dimensional linear differential filter and comparing the output value of said filter with said threshold value to obtain the edge information; and performing the smoothing process on said decoded image signal based on said detected edge information.

* * * * *